United States Patent
Singh Bawa et al.

(10) Patent No.: US 12,159,105 B2
(45) Date of Patent: Dec. 3, 2024

(54) AUTOMATED CATEGORIZATION AND SUMMARIZATION OF DOCUMENTS USING MACHINE LEARNING

(71) Applicant: Accenture Global Solutions Limited, Dublin (IE)

(72) Inventors: Gurpreet Singh Bawa, Gurgaon (IN); Kaustav Pakira, Mumbai (IN); Souvik Chakraborty, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 621 days.

(21) Appl. No.: 17/161,637

(22) Filed: Jan. 28, 2021

(65) Prior Publication Data
US 2022/0237373 A1    Jul. 28, 2022

(51) Int. Cl.
*G06F 40/20* (2020.01)
*G06F 16/93* (2019.01)
*G06N 20/00* (2019.01)

(52) U.S. Cl.
CPC .............. *G06F 40/20* (2020.01); *G06F 16/93* (2019.01); *G06N 20/00* (2019.01)

(58) Field of Classification Search
CPC ........ G06F 40/20; G06F 16/93; G06F 16/355; G06F 16/345; G06N 20/00
See application file for complete search history.

(56) References Cited

U.S. PATENT DOCUMENTS

| | | | | |
|---|---|---|---|---|
| 7,162,413 | B1* | 1/2007 | Johnson | G06F 16/345 |
| | | | | 706/45 |
| 10,157,347 | B1* | 12/2018 | Kasturi | G06F 16/3326 |
| 2001/0037273 | A1* | 11/2001 | Greenlee, Jr. | G06Q 10/10 |
| | | | | 705/35 |
| 2003/0033347 | A1* | 2/2003 | Bolle | G06F 16/786 |
| | | | | 707/E17.022 |
| 2007/0162447 | A1* | 7/2007 | Joshi | G06F 16/951 |

(Continued)

OTHER PUBLICATIONS

Kedzie, C., McKeown, K., & Daume III, H. (2018). Content selection in deep learning models of summarization. arXiv preprint arXiv:1810.12343. (Year: 2018).*

*Primary Examiner* — Douglas Godbold
*Assistant Examiner* — Philip H Lam

(57) ABSTRACT

Aspects of the present disclosure provide systems, methods, and computer-readable storage media that support automated summarization of documents using machine learning and artificial intelligence. The summaries include document category-specific summaries for different categories of documents. To illustrate, a document processing device may receive input data representing a document and provide first feature data based on the input data to one or more machine learning (ML) models to select a document category of a plurality of predefined document categories. The document processing device may provide second feature data based on the input data to a second set of ML models associated with the selected document category to generate annotation data associated with the document. The document processing device may provide the annotation data to a third set of ML models to generate a summary of the document, and the document processing device may generate an output based on the summary.

22 Claims, 8 Drawing Sheets

(56) References Cited

U.S. PATENT DOCUMENTS

| | | | |
|---|---|---|---|
| 2008/0177772 A1* | 7/2008 | Karamchedu | G06F 16/93 707/999.102 |
| 2015/0032645 A1* | 1/2015 | McKeown | G06F 16/93 705/311 |
| 2018/0241881 A1* | 8/2018 | Li | G06Q 10/10 |
| 2018/0268053 A1* | 9/2018 | Tata | G06F 16/345 |
| 2019/0012367 A1* | 1/2019 | Bari | G06F 16/287 |
| 2019/0294658 A1* | 9/2019 | Banerjee | G06F 9/451 |
| 2020/0028677 A1* | 1/2020 | Herder, III | H04L 9/30 |
| 2020/0111023 A1* | 4/2020 | Pondicherry Murugappan | G06N 5/02 |
| 2020/0210490 A1* | 7/2020 | Hutchins | G06V 30/412 |
| 2020/0235927 A1* | 7/2020 | Shimoni | H04L 9/50 |
| 2020/0327432 A1* | 10/2020 | Doebelin | G06N 5/04 |
| 2020/0342019 A1* | 10/2020 | Manba | G06F 16/93 |
| 2020/0364404 A1* | 11/2020 | Priestas | G06V 30/19173 |
| 2021/0034813 A1* | 2/2021 | Wu | G06N 3/042 |
| 2021/0209142 A1* | 7/2021 | Tagra | G06N 3/044 |
| 2021/0303783 A1* | 9/2021 | Misra | G06F 16/9024 |
| 2021/0319179 A1* | 10/2021 | Muffat | G06F 21/6245 |
| 2021/0383064 A1* | 12/2021 | Wang | G06F 40/166 |
| 2022/0164397 A1* | 5/2022 | Escalona | G06F 40/20 |
| 2022/0199254 A1* | 6/2022 | Tuysuzoglu | A61B 5/7275 |

\* cited by examiner

AUTOMATED CATEGORIZATION AND SUMMARIZATION OF DOCUMENTS USING MACHINE LEARNING

TECHNICAL FIELD

The present disclosure relates generally to systems and methods for leveraging machine learning and artificial intelligence to categorize and summarize various categories of documents.

BACKGROUND

Enterprises process and store many documents during the ordinary course of business. The volume of documents may be large and may include many different categories, and sub-categories, of related and unrelated documents. When searching for a stored document, it is time consuming and expensive to run a search that evaluates the entirety of each stored document or to require manual review of the stored documents. If significant time and financial resources cannot be dedicated to document searches, documents are unlikely to be located, which can have severe impacts. For example, a bank may have hundreds of thousands of pages of loan documents of all types, such as home loans, business loans, and the like. If a particular loan is challenged, the bank needs to be able to find and produce the particular loan. Even though a particular associate at the bank may know of the loan details, the bank will be required to dedicate significant time and resources to locate documentation of the loan in order to prove the details. If the bank is unable to locate the documentation of the loan amongst its many documents, it might suffer a loss equivalent to the outstanding balance of the loan on top of the resources dedicated trying to find the loan. As another example, a commercial supplier may store documentation in an electronic database of thousands of different types of widgets they can offer for potential sales. A salesperson may access the electronic database to ensure that a commercial supplier has a particular widget prior to a sale. If documentation for the particular widget cannot be located within the electronic database due to the significant time and personnel resources required to search large databases, the salesperson will not know they have an item available for sale and will miss sales opportunities. Additionally, without dedicating significant time and financial resources to maintain the electronic databases, the commercial supplier will lose track of the widgets they have physically stored. Thus, the widget will take up valuable, physical storage space until an employee happens to notice it during a physical warehouse audit, at which point, the widget might be obsolete.

To address the significant resource requirements associated with document searches, summaries of documents may be created and subsequent searches or manual review may only consider information in the summaries. Document summaries are primarily manual data entries that require an individual to review a document and produce a brief summary. Due to the significant amount of information in each document, manual summarization is a time consuming and inefficient process. Manually created summaries are often inconsistent and may omit key information due to individual biases of the individuals summarizing the documents. Automated document summarization techniques have begun to surface; however, these techniques still have many drawbacks. Some conventional methods of automated document summarization involve extracting specific words, phrases, or sentences from a document and combining the extractions to generate a summary. Under these methods, problems may arise because the approach does not consider the specific extractions with respect to either the surrounding words, phrases, or sentences or in the context of the document as a whole. Thus, semantic relationships of words, phrases, or sentences across sentences and the document as a whole are missed, which can result in fragmentation, lack of readability, and missing information within the generated summaries. Additionally, these methods face difficulty in summarizing different categories of documents, as the words, phrases, or sentences that are highly informative in one category may not be as informative in other categories. Some other conventional methods of automated document summarization attempt to understand a document as a whole to improve the quality of a summary. In order to learn information about a particular category of documents, a large volume of reference documents need to be analyzed to determine commonalities. Under these methods, problems arise due to the significant storage requirements associated with the large volume of reference documents, in addition to processing resources needed to compare and analyze the reference documents, and then to compare input documents to the reference documents. Thus, conventional document summarization methods do not provide an efficient, scalable approach for accurately evaluating semantic relationships of words, phrases, and sentences across entire documents of multiple different categories.

SUMMARY

Aspects of the present disclosure provide systems, methods, apparatus, and computer-readable storage media that support type-specific automated document summarization (also referred to as encapsulation). The techniques of the present disclosure may leverage artificial intelligence and machine learning to generate semantically correct document summaries (e.g., encapsulations) for multiple categories of documents using minimal, or no, user input. In some aspects, a system of the present disclosure may categorize a document into one of multiple predefined categories using trained artificial intelligence and machine learning. After the categorization, the system may generate category-specific annotations (e.g., annotation data) based on the document using trained artificial intelligence and machine learning. For example, if the document is categorized as a lease, the system may look for terms relevant to a lease, such as lease duration, lease price, lease parties, and the like. Once the document is annotated, the system may create a category-specific summary of the document based on the annotation data. The summary may be generated using artificial intelligence and machine learning that is trained based on a few category-specific summary templates, instead of requiring a large volume of reference documents for training or comparing.

In some aspects, a document processing device may receive a document and produce a summary for the document based on document categorization and category specific annotations. In some implementations, the document may be categorized into one of multiple predefined document categories using a first set of machine learning (ML) models. The first set of ML models may be trained to determine underlying similarities and differences between different categories of documents based on word features, word layout features, pixel features of non-word elements, or a combination thereof, from labeled documents of the different categories. After categorizing the document, the document processing device may annotate the document (e.g., generate annotation data) based on the category of the document. The document may be annotated via a second set of ML models trained to generate annotation data for documents having the document category. The annotation process for a particular document category may be based on qualitative and quantitative features associated with documents of the particular document category. In some implementations, the annotation process may involve identifying one or more entities such as words, numbers, and the like that correspond to highly relevant information for the particular document category. After generating the annotation data, the document processing device may generate a summary based on the annotation data using a third set of ML models. The third set of ML models may be trained to summarize a document of the document category based on category-specific annotation data. In some implementations, the third set of ML models may be trained based on category-specific summary templates and category-specific annotation data.

The present disclosure describes systems, methods, apparatus, and computer-readable media that provide benefits compared to conventional document summarization systems. For example, the systems described herein enable documents across multiple document categories to be summarized with little to no user input. Additionally, the systems described herein generate document summaries that are more semantically correct than document summaries generated by conventional systems by using ML models that are trained to provide category-specific annotations based on analysis of the document as a whole. Also, the systems described herein enable faster summarization of documents using fewer processing resources than conventional summarization systems due to the category-specific document summarization. Further, the systems described herein use ML models that can be trained with significantly fewer training documents as compared to the large volume of reference documents some conventional systems analyze to improve semantic understanding of documents. These improvements to document summarization enable generation of document summaries that enable fast and accurate document indexing and searching for a variety of different document categories.

In a particular aspect, a method for category-specific document summarization includes receiving, by one or more processors, input data representing a document. The method also includes providing, by the one or more processors, first feature data extracted from the input data to a first set of machine learning (ML) models to select a document category corresponding to the document from a plurality of predefined document categories. The first set of ML models are configured to categorize documents into the plurality of predefined document categories based on input feature data. The method includes providing, by the one or more processors, second feature data extracted from the input data to a second set of ML models to generate annotation data corresponding to the document. The second set of ML models are configured to generate annotation data corresponding to documents having the selected document category based on input feature data. The method also includes providing, by the one or more processors, the annotation data to a third set of ML models to generate a summary of the document. The third set of ML models are configured to generate summaries of documents having the selected document category based on input annotation data. The method further includes generating, by the one or more processors, an output that includes the summary.

In another particular aspect, a device for category-specific document summarization includes a memory and one or more processors communicatively coupled to the memory. The one or more processors are configured to receive input data representing a document. The one or more processors are also configured to provide first feature data extracted from the input data to a first set of ML models to select a document category corresponding to the document from a plurality of predefined document categories. The first set of ML models are configured to categorize documents into the plurality of predefined document categories based on input feature data. The one or more processors are configured to provide second feature data extracted from the input data to a second set of ML models to generate annotation data corresponding to the document. The second set of ML models are configured to generate annotation data corresponding to documents having the selected document category based on input feature data. The one or more processors are also configured to provide the annotation data to a third set of ML models to generate a summary of the document. The third set of ML models are configured to generate summaries of documents having the selected document category based on input annotation data. The one or more processors are further configured to generate an output that includes the summary.

In another particular aspect, a non-transitory computer-readable storage medium stores instructions that, when executed by one or more processors, cause the one or more processors to perform operations for category-specific document summarization. The operations include receiving input data representing a document. The operations also include providing first feature data extracted from the input data to a first set of ML models to select a document category corresponding to the document from a plurality of predefined document categories. The first set of ML models are configured to categorize documents into the plurality of predefined document categories based on input feature data. The operations include providing second feature data extracted from the input data to a second set of ML models to generate annotation data corresponding to the document. The second set of ML models are configured to generate annotation data corresponding to documents having the selected document category based on input feature data. The operations also include providing the annotation data to a third set of ML models to generate a summary of the document. The third set of ML models are configured to generate summaries of documents having the selected document category based on input annotation data. The operations further include generating an output that includes the summary.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that leverage artificial intelligence and machine learning to generate semantically correct document summaries (also referred to as encapsulations) for multiple categories of documents using minimal, or no, user input. To illustrate, a system of the present disclosure may use trained artificial intelligence and machine learning to categorize, annotate, and summarize a document. The system may categorize an input document based on similarities between features of the input document and features of documents from multiple predefined document categories by utilizing a first set of one or more machine learning (ML) models. After the input document is categorized, the system may annotate the input document by identifying and tagging specific words or phrases as entity values of one or more category-specific entities (e.g., words or phrases that are highly informative and relevant to summarizing documents of the respective document category). To annotate the input document, the system may utilize a particular set of one or more second ML models that is selected from multiple sets of category-specific second ML models based on the particular set of second ML models corresponding to the determined document category. Each of the multiple sets of category-specific second ML models may be configured to output annotation data for a respective category of documents based on input feature data. To generate a summary of the input document, the system may generate a summarized document based on annotation data that indicates the tagged entity values from the input document. To generate the summarized document, the system may utilize a particular set of one or more third ML models that is selected from multiple sets of category-specific third ML models based on the particular set of third ML models corresponding to the determined document category. Each of the multiple sets of category-specific third ML models may be configured to output summaries for a respective category of documents based on input annotation data. The various ML models may be trained using training data that is based on labeled and annotated documents of each of the predefined document categories and one or more summary templates corresponding to each of the predefined document templates.

Figure 1:
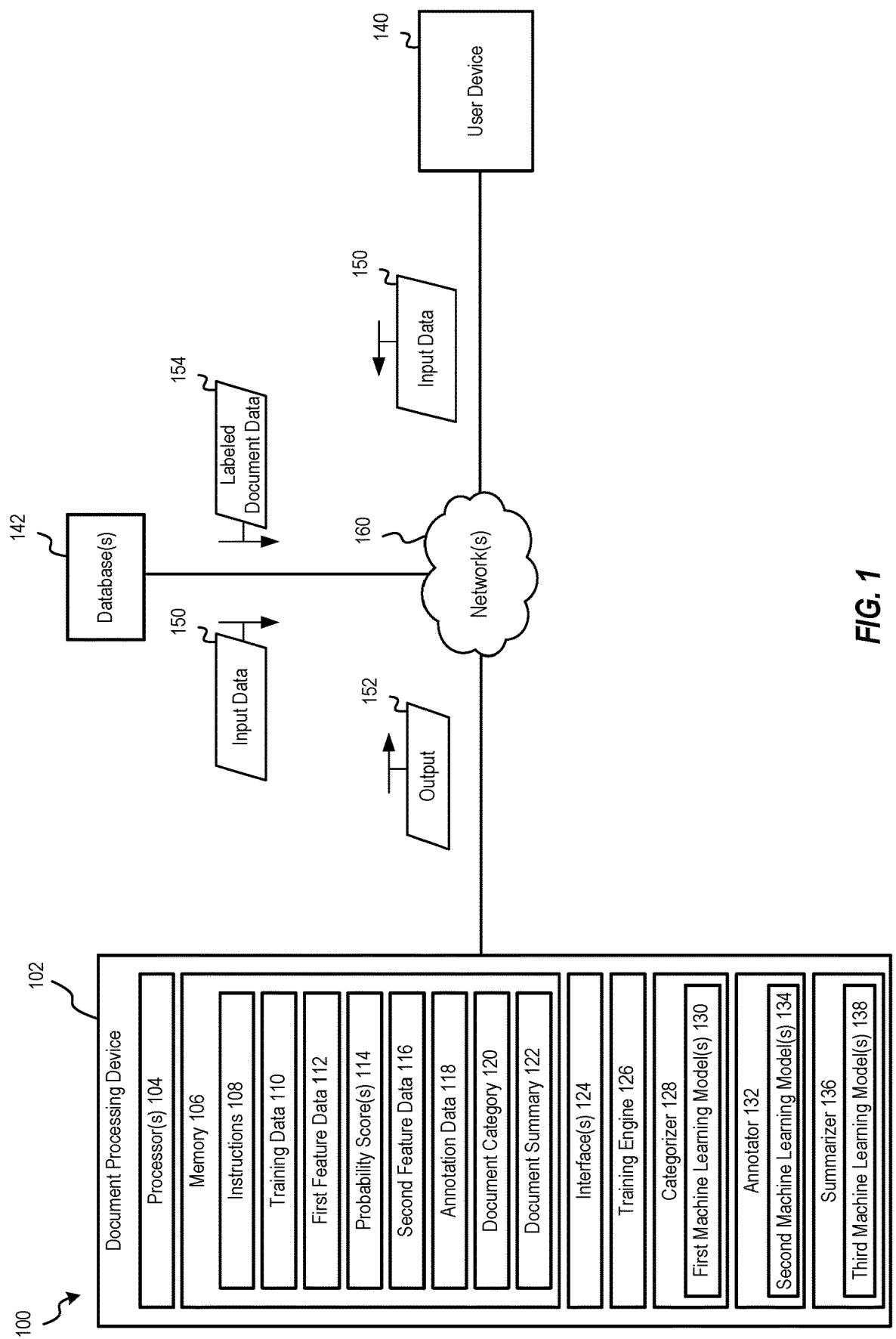
FIG. 1 is a block diagram of an example of a system that supports category-specific document summarization according to one or more aspects.

Referring to FIG. 1, an example of a system that supports category-specific document summarization according to one or more aspects is shown as a system 100. The system 100 may be configured to categorize and summarize (e.g., encapsulate) unlabeled documents using artificial intelligence and machine learning. As shown in FIG. 1, the system 100 includes a document processing device 102, a user device 140, one or more databases 142 (referred to herein as "the databases 142"), and one or more networks 160. In some implementations, one or more of the user device 140 or the databases 142 may be optional, or the system 100 may include additional components, such as a server, additional document storage, additional user devices, or the like, as a non-limiting example.

The document processing device 102 (e.g., a computing device or server) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The document processing device 102 includes one or more processors 104, a memory 106, one or more communication interfaces 124, a training engine 126, a categorizer 128, a first set of one or more machine learning (ML) models 130 (referred to herein as "the first ML models 130"), an annotator 132, a second set of one or more ML models 134 (referred to herein as "the second ML models 134"), a summarizer 136, and a third set of one or more ML models 138 (referred to herein as "the third ML models 138"). In some other implementations, one or more of the components 126-138 may be optional, one or more additional components may be included in the document processing device 102, or both. It is noted that functionalities described with reference to the document processing device 102 are provided for purposes of illustration, rather than by way of limitation and that the exemplary functionalities described herein may be provided via other types of computing resource deployments. For example, in some implementations, computing resources and functionality described in connection with the document processing device 102 may be provided in a distributed system using multiple servers or other computing devices, or in a cloud-based system using computing resources and functionality provided by a cloud-based environment that is accessible over a network, such as the one of the one or more networks 160. To illustrate, one or more operations described herein with reference to the document processing device 102 may be performed by one or more servers or a cloud-based system that communicates with one or more client or user devices, a workbench platform (e.g., executed by a server or distributed among multiple devices), or the like.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the document processing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the document processing device 102 may be stored in the memory 106 as instructions 108 that, when executed by the one or more processors 104, cause the one or more processors 104 to perform the operations described herein with respect to the document processing device 102, as described in more detail below. Additionally, the memory 106 may be configured to store data and information, such as training data 110, first feature data 112, one or more probability scores 114, second feature data 116, annotation data 118, a document category 120, and a document summary 122. Illustrative aspects of the training data 110, the first feature data 112, the probability scores 114, the second feature data 116, the annotation data 118, the document category 120, and the document summary 122 are described in more detail below.

The one or more communication interfaces 124 may be configured to communicatively couple the document processing device 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the document processing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the document processing device 102. In some implementations, the document processing device 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the document processing device 102.

The training engine 126 is configured to generate the training data 110 for training one or more ML models used by the document processing device 102, such as one or more of the first ML models 130, the second ML models 134, or the third ML models 138, as further described below. For example, the training engine 126 may generate the training data 110 based on labeled (e.g., categorized) documents from the databases 142 (or from the user device 140), one or more category-specific summaries or summary templates, other document or feature data, or a combination thereof. In some implementations, different ML models may be trained using different types of training data, and in some such implementations, the training data 110 may include multiple different portions of training data (e.g., first training data corresponding to the first ML models 130, second training data corresponding to the second ML models 134, third training data corresponding to the third ML models 138, etc.).

The categorizer 128 is configured to categorize input documents into corresponding categories of a group predefined document categories based on similarities between the input documents and documents of the predefined document categories. For example, the categorizer 128 may be configured to analyze the input documents to identify and extract particular features (also referred to as key performance indicators (KPIs)) that are used to assign the input documents to predefined document categories that include documents having the most similar features. In some implementations, the predefined document categories include or correspond to document types, which may include broad types or categories such as manuals, educational documents, legal documents, sales documents, lab results, journal articles, notes, and the like, or more specific types or categories, such as leases, contracts, receipts, lecture notes, worksheets, orders, experimental results, meeting transcriptions, e-mails, action tickets, news articles, research publications, or the like. The features may include word features and word layout features, non-word object layout features (referred to herein as "pixel features" that correspond to layout of non-word objects, such as images, graphics, tables, lines, bullets, designs, colors, headings, sub-headings, and the like), or a combination thereof.

To illustrate, the categorizer 128 may be configured to perform vectorization and natural language processing (NLP) on an input document, such as tokenization, lemmatization, sentencization, part-of-speech tagging, bag of words vectorization, term frequency-inverse document frequency (TF-IDF) vectorization, stop-character parsing, named entity recognition, semantic relation extraction, and the like, to generate word features, such as word identification (e.g., for generating a word corpus), word frequencies, word ratios, and the like, to generate or extract word features from the input document. The categorizer 128 may be configured to generate word layout features based on the input document, such as pixel locations of words in the input document, distances between words, and the like. The categorizer 128 may also be configured to generate pixel layout features based on the input document, such as pixel locations of other elements in the document, distances between elements, element types, and the like. The categorizer 128 may compare the word features, the word layout features, the pixel layout features, other features, or a combination thereof, associated with the input document to the corresponding features associated with documents of each of the predefined document categories and to assign the input document to the predefined document category associated with documents having the most similar features. In some implementations, the comparison may be performed using similarity scores (e.g., distance values in feature space between two sets of features), and the input document may be assigned to the predefined document category associated with the greatest similarity score.

In some implementations, the categorizer 128 may include or access (e.g., at the memory 106, a storage device of the document processing device 102, or a device that is coupled to or accessible to the document processing device 102 via the networks 160) the first ML models 130 that are configured to categorize input documents. For example, the first ML models 130 may include a single ML model or multiple ML models that are configured to categorize documents into the predefined document categories based on input feature data. In some implementations, the first ML models 130 may be implemented as one or more neural networks (NNs). In some other implementations, the first ML models 130 may be implemented as other types of ML models or constructs, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, and the like. In some implementations, the first ML models 130 may be configured to output probability scores indicating the estimated probability that an input document corresponds to each of the predefined document categories, and the input document may be assigned to the predefined document category associated with the greatest probability score.

The annotator 132 is configured to perform category-specific annotation (e.g., to generate annotation data) based on input documents. To illustrate, each document category may have a specific group of entities (e.g., particular names, places, amounts, dates, words, phrases, and the like) that are highly relevant to summarizing documents of the respective document category, and the annotator 132 may be configured to analyze feature data for an unlabeled input document and generate annotation data that includes the names (e.g., identifiers) of the entities and the corresponding entity values within the input document. As an illustrative example, a first document category may include leases, and the respective group of entities corresponding to leases may include a first party, a second party, a duration of the lease, a starting date of the lease, and a payment value from the second party to the first party to pay for the object of the lease. In such an example, the annotator 132 may receive features from an input document, and, based on an output of the categorizer 128 indicating that the input document is a lease, the annotator 132 may generate annotation data that indicates a name associated with the first party, a name associated with the second party, a length of time associated with the duration, a date associated with the starting date, and a dollar amount associated with the payment value. As another illustrative example, a second document category may include meeting notes, and the respective group of entities corresponding to meeting notes may include a date of the meeting, a location of the meeting, a number of attendees at a meeting, one or more speakers at the meeting, one or more subjects discussed at the meeting, and results of any votes taken at the meeting.

The feature data processed by the annotator 132 to generate annotation data may include qualitative word features, quantitative word features, pixel features (as described above), or a combination thereof. The qualitative word features may include length of words, percentage of capital letters in words, fuzzy representations of words, other qualitative word features, or a combination thereof, as non-limiting examples. The quantitative word features may include word counts, word locations (e.g., pixel locations of an optimal bounded four-sided polygon and a centroid of each word), other quantitative word features, or a combination thereof, as non-limiting examples. Based on the input feature data, the annotator 132 may be configured to tag each word or phrase indicated by the input features either to be classified as an entity or not to be classified. The words or phrases classified as entities may be compared to the category-specific group of entities to determine which label to apply to each of the tagged words or phrases, as further described below.

In some implementations, the annotator 132 may include or access (e.g., at the memory 106, a storage device of the document processing device 102, or a device that is coupled to or accessible to the document processing device 102 via the networks 160) the second ML models 134 that are configured to generate corresponding annotation data based on input documents associated with a particular document category. For example, the second ML models 134 may include a single ML model or multiple ML models that are configured to generate annotation data based on input feature data from documents associated with a particular document category. Although one set of the second ML models 134 is shown in FIG. 1, such illustration is for convenience, and the annotator 132 includes (or has access to) a respective set of one or more second ML models for each of the document categories. For example, if the categorizer 128 is configured to categorize input documents into one of four document categories, there are four sets of second ML models, each corresponding to one of the four document categories. In some implementations, the second ML models 134 may be implemented as one or more NNs. For example, the second ML models 134 may be implemented as one or more deep recurrent neural networks (RNNs). In some other implementations, the second ML models 134 may be implemented as other types of ML models or constructs, such as SVMs, decision trees, random forests, regression models, BNs, DBNs, NB models, Gaussian processes, HMMs, regression models, and the like. In some implementations, the second ML models 134 may be configured to output probability scores indicating the estimated probability that an annotation (e.g., an extracted word, phrase, or sentence) corresponds to each of a category-specific group of entities (or is not to be labeled), and the annotation data may indicate that the annotation is the value of the entity associated with the greatest probability score.

The summarizer 136 is configured to generate category-specific summaries for input documents based on input annotation data. The summaries may include important information from the related documents in a concise, easy-to-read presentation instead of requiring a user to read the entire documents. The summaries may be designed and tailored to information common to the respective document category, which includes static summary text and entity values indicated by the annotation data. To illustrate, the summarizer 136 may be configured to generate different summaries for different categories of documents using respective annotation data. As an illustrative example, if a first document is a lease, the summarizer 136 may generate a first summary that explains who (e.g., a first party and a second party in the annotation data) agreed to the lease, when (e.g., a starting date in the annotation data) the lease was agreed upon, the duration (e.g., a duration in the annotation data) of the lease, and the value (e.g., a payment amount in the annotation data) of the lease. Instead of only providing the entity values, or labeled entity values, from the annotation data, the summary may include grammatically correct sentences to convey the information, as well as information common to all leases (e.g., static category-specific information). As another illustrative example, if a second document is notes from a meeting, the summarizer 136 may generate a second summary that explains when the meeting occurred (e.g., a date in the annotation data), how many members were present (e.g., a number of attendees in the annotation data), a speaker and the topic they spoke on (e.g., a first speaker and a first subject in the annotation data), and whether a proposal passed (e.g., a voting result in the annotation data), as well as information common to all meetings.

In some implementations, the summarizer 136 may include or access (e.g., at the memory 106, a storage device of the document processing device 102, or a device that is coupled to or accessible to the document processing device 102 via the networks 160) the third ML models 138 that are configured to generate summaries of input documents associated with a particular document category. For example, the third ML models 138 may include a single ML model or multiple ML models that are configured to generate summaries based on annotation data from documents associated with a particular document category. Although one set of the third ML models 138 is shown in FIG. 1, such illustration is for convenience, and the summarizer 136 includes (or has access to) a respective set of one or more third ML models for each of the document categories. For example, if the categorizer 128 is configured to categorize input documents into one of four document categories, there are four sets of third ML models, each configured to generate summaries for one of the four document categories. In some implementations, the third ML models 138 may be implemented as one or more NNs. For example, the third ML models 138 may be implemented as one or more RNNs, such as RNNs configured as a long short-term memory (LSTM). In some other implementations, the third ML models 138 may be implemented as other types of ML models or constructs, such as SVMs, decision trees, random forests, regression models, BNs, DBNs, NB models, Gaussian processes, HMMs, regression models, and the like. In some implementations, the third ML models 138 may be configured to output different summaries for the same document category based on the quantity or values of the input annotation data.

The user device 140 is configured to provide document creation, management, processing, analysis, and presentation for multiple categories of documents. For example, the user device 140 may be configured to support a cross-domain workbench to enable user interaction with multiple categories of documents. Alternatively, the user device 140 may correspond to multiple user devices that each support a domain-specific workbench enable user interaction with a corresponding category of documents. As an illustrative example, a domain-specific workbench may include a legal document workbench that supports user generation, editing, analyzation, and organizing of legal documents such as leases, contracts, depositions, motions, exhibits, and the like. As another illustrative example, a cross-domain workbench may include an organization-specific workbench that includes supports user access to financial documents (e.g., purchase orders, receipts, electronic fund transfers, budgets, etc.), human resource documents (e.g., policies, training manuals, personal reviews, request forms, etc.), marketing documents (e.g., press releases, advertisements, marketing plans, news articles, interviews, etc.), and technician documents (e.g., time cards, activity logs, inventory requests, etc.). The user device 140 may include or correspond to, a mobile device (e.g., a smart phone, a tablet, a personal digital assistant (PDA), a wearable device, and the like), a desktop computing device, a laptop computing device, a personal computing device, a tablet computing device, a server, a VR device, an AR device, an XR device, a vehicle (or a component thereof), an entertainment system, other computing or electronic devices, or a combination thereof, as non-limiting examples.

The databases 142 (e.g., one or more document warehouses) are configured to store data corresponding to documents used by an organization, an enterprise, or other group that owns or operates the user device 140 and the document processing device 102. The data may include text data, image data, combinations of text and image data (e.g., electronic document data, such as a portable document format (PDF) file), audio data, multimedia data, or any other type of data used to store documents. The databases 142 may be configured to store multiple categories of documents, from broad categories to specific sub-categories, across one or more domains. The documents may include labeled documents (e.g., documents for which a respective document category, annotations, other information, or a combination thereof is indicated, such as in metadata), unlabeled documents (e.g., documents that are not tagged or do not include metadata), or a combination thereof. Documents generated by the user device 140 and the document processing device 102 may be provided to the databases 142 for storage, and documents retrieved from the databases 142 may be provided to the document processing device 102 or the databases 142. Although illustrated in FIG. 1 as a single database, in some other implementations, the databases 142 include multiple communicatively coupled databases.

During operation of the system 100, the user device 140 may transmit the input data 150 to the document processing device 102 for categorization and summarization. For example, a user of the user device 140 may create or select an input document to be summarized, such as via a workbench application executed by the user device 140, and the input data 150 may correspond to the input document. To illustrate, the input data 150 may include text data corresponding to the input document, image data corresponding to the input document (e.g., if the input document is a scanned document), electronic document data, such as a PDF file, corresponding to the input document (e.g., if the input document is created or scanned using an electronic document management application), or a combination thereof. Alternatively, the input data 150 may be transmitted to the document processing device 102 from the databases 142. For example, a user of the user device 140 may select an input document stored at the databases 142 to be summarized, and the user device 140 and the databases 142 may communicate to cause the input data 150 corresponding to the input document to be provided from the databases 142 to the document processing device 102. The input document may be an unlabeled document. For example, the input data 150 may not include metadata or any other indication of a category (e.g., a file type) associated with the input document.

The categorizer 128 may generate the first feature data 112 based on the input data 150. To illustrate, the categorizer 128 may convert the input data 150 to text data if the input data 150 is not already text data, such as by performing optical character recognition (OCR) or any other type of text conversion operations on the input data. If the input data 150 is text data (or after converting the input data 150 to text data), the categorizer 128 may perform NLP on the input data to generate or extract the first feature data 112. For example, the NLP may identify words, phrases, sentences, punctuation, and the like from the input data 150, and information associated with the identifications, such as counts, ratios, classifications, and the like may be included in the first feature data 112. In some implementations, the first feature data 112 includes word features associated with the input document, word layout features associated with the input document, and pixel features associated with one or more non-word elements of the input document. The word features may include word counts (e.g., counts of each distinct word or phrase (e.g., string) within the input document), word ratios (e.g., ratios of the counts of the words or phrases to a total corpus of words or phrases in the input document), classifications (e.g., significant or insignificant words), word lengths, capital letter counts, and the like. The word layout features may include pixel locations of words within a pixel array associated with the input document, distances between words, word dimensions, sentence indices, and the like. The pixel features may include pixel locations of non-word elements within the pixel array associated with the input document, distances between non-word elements, classifications of non-word elements, dimensions of non-word elements, and the like. The non-word elements may include images, graphics, tables, lines, bullets, designs, logos, colors, headings, sub-headings, and the like. In some implementations, the pixel features may be stored as at the memory 106 as a three-dimensional (3D) matrix data structure, as further described herein with reference to FIG. 4. Although described as being text, image, or electronic document data, in some other implementations, the input data 150 may be audio data, such as a recording of a person speaking (e.g., reading aloud) the input document, and the categorizer 128 may perform one or more automatic speech recognition (ASR) operations on the input data 150 to generate text data for performing the NLP and generating the first feature data 112.

The categorizer 128 may assign the input document (e.g., corresponding to the input data 150) to one of multiple predefined document categories based on the first feature data 112. In some implementations, the categorizer 128 may perform the categorization using the first ML models 130. To illustrate, the categorizer 128 may provide first feature data 112 as input data to first ML models 130 to assign the input document to the document category 120 (e.g., one of the multiple predefined document categories). The first ML models 130 may be trained to categorize documents into the multiple predefined document categories based on input feature data based on the documents. For example, based at least in part on the first feature data 112 including a word ratio for the word "leaser" that satisfies a threshold (among other relevant features), the first ML models 130 may assign the input document to a "lease" category. As another example, based at least in part on the first feature data 112 including a pixel location of a vertex of a table being located at a first particular pixel location and a centroid of a logo being located at a second particular pixel position (among other relevant features), the first ML models 130 may assign the input document to a "sales brochure" category. These illustrative examples are simplified for ease of understanding, and the first ML models 130 may be configured to categorize documents based on any types of underlying similarities between documents, including similarities that are highly complex, through supervised learning, as further described herein.

In some implementations, the first ML models 130 may be configured to output probability scores that indicate likelihoods that the input document (e.g., the first feature data 112) corresponds to each of the multiple predefined document categories. To illustrate, the first ML models 130 may output at least some of the probability scores 114, and the probability scores 114 may include, for each category of the multiple predefined document categories, a probability score indicating a likelihood that the input document corresponds to the respective category, as further described herein with reference to FIG. 5. As an illustrative example, if the multiple predefined document categories include legal documents, accounting documents, human resources documents, and marketing documents, the probability scores 114 may include a first probability score indicating a likelihood that the input document is a legal document, a second probability score indicating a likelihood that the input document is an accounting document, a third probability score indicating a likelihood that the input document is a human resources document, and a fourth probability score indicating a likelihood that the input document is a marketing document. The categorizer 128 may assign the input document to the document category associated with the highest probability score (or a highest probability score that satisfies a threshold, if additional categorizations are possible). In the previous example, if the first probability score is 0.7, the second probability score is 0.2, the third probability score is 0.55, and the fourth probability score is 0.4, the document category 120 assigned to the input document is legal documents.

After categorization of the input document (e.g., determination of the document category 120 by the categorizer 128), the annotator 132 may generate the second feature data 116 based on the document category 120 and the input data 150. For example, annotator 132 may generate or extract features from the input data 150 for use in annotating the input document (e.g., generating annotation data associated with the input document). The second feature data 116 may include category-agnostic features (e.g., one or more features included in the first feature data 112) and category-specific features based on the document category 120 (e.g., one or more features that may not be included in the first feature data 112). The second feature data 116 may include qualitative word features of the input document, quantitative word features of the input document, pixel features non-word elements of the input document, or a combination thereof. The qualitative word features may include length of words, percentage of capital letters in words, classification of words, fuzzy representations of words, other qualitative word features, or a combination thereof. The quantitative word features may include word counts, word locations (e.g., pixel locations of an optimal bounded four-sided polygon and a centroid for each word), word distances, word ratios, other quantitative word features, or a combination thereof. The pixel features may include similar features as described above with reference to the first feature data 112. In some implementations, the qualitative word features, the quantitative word features, and the pixel features may be filtered to discard features that apply to one or more words or non-word elements that are not included in a category-specific list of words or non-word elements that is associated with the document category 120. Additionally or alternatively, the second feature data 116 may include a category-specific entity list that is associated with the document category 120. The category-specific entity list may include labels (e.g., names or identifiers) of entities that are to be included in documents of the document category 120. As an illustrative example, if the document category 120 is leases, the category-specific entity list may include entities (or keywords) having labels of Party_A, Party_B, Lease Date, Duration, and Lease Value.

The annotator 132 may generate the annotation data 118 (e.g., annotate the input document) based on the second feature data 116. In some implementations, the annotator 132 may perform the annotation using the second ML models 134. To illustrate, the annotator 132 may provide the second feature data 116 to the second ML models 134 to generate the annotation data 118. For example, based on the second ML models 134 corresponding to the document category 120, the annotator 132 may select the second ML models 134 (from multiple category-specific ML models, as further described herein) and provide the second feature data 116 as input to the second ML models 134. The second ML models 134 may generate annotation data based on feature data associated with documents having the document category 120. The annotation data 118 may include extractions (e.g., words, phrases, etc.) that are assigned as entity values to the category-specific entities. As an illustrative example, if the document category 120 is leases, the annotation data 118 may include the values for the entities Party_A, Party_B, Lease Date, Duration, and Lease Value that are included in the input document, such as "Evergreen Rentals, LLC", "Bob Tenant," "Feb. 28, 2021," "six months," and "$150,000."

In some implementations, the second ML models 134 may be configured to output probability scores that indicate likelihoods that various extractions (e.g., particular words or phrases in the input document) correspond to each of category-specific entities. To illustrate, the second ML models 134 may output at least some of the probability scores 114, and the probability scores 114 may include, for each extraction from the input document, probability scores indicating likelihoods that the extraction corresponds to each of the category-specific entities and, optionally, that the extraction does not correspond to any entity, as further described herein with reference to FIG. 6. As an illustrative example, if the document category 120 includes leases and the category-specific entities include Party_A, Party_B, Lease Date, Duration, and Lease Value, the probability scores 114 may include a first probability score indicating a likelihood that extraction is the name of Party_A in the input document, a second probability score indicating a likelihood that the extraction is the name of Party_B in the input document, a third probability score indicating a likelihood that the extraction is the date of the lease in the input document, a fourth probability score indicating a likelihood that the extraction is the duration of the lease in the input document, a fifth probability score indicating that the extraction is the value of the lease in the input document, and a sixth probability score indicating a likelihood that the extraction is not one of the entities Party_A, Party_B, Lease Date, Duration, or Lease Value. The annotator 132 may generate the annotation data 118 such that, for each of the category-specific entities, the entity value is the extraction associated with the highest probability score (or a highest probability score that satisfies a threshold, if additional annotation possible). In the previous example, if the extraction is "Bob Tenant", the first probability score is 0.65, the second probability score is 0.83, the third probability score is 0.2, the fourth probability score is 0.2, the fifth probability score is 0.2, and the sixth probability score is 0.45, the annotation data 118 indicates that the value of Party_B in the assigned document is "Bob Tenant." Although described as including a probability score for a likelihood that an extraction is not one of the category-specific entities, in some other implementations, the annotator 132 may perform a multi-step operation to generate the annotation data 118. To illustrate, the annotator 132 may provide the second feature data 116 to a first subset of the second ML models 134 that is configured to output, for each extraction, a probability score indicating a likelihood that the extraction is an entity value (or alternatively a probability score indicating a likelihood that the extraction is not an entity value). The annotator 132 may provide extractions that are associated with probability scores that satisfy a threshold to a second subset of the second ML models 134 for determination of probability scores that indicate the likelihoods that the selected extractions correspond to each of category-specific entities (or alternatively the annotator 132 may discard extractions that are associated with probability scores that satisfy a threshold if the probability scores indicate the likelihood that the respective extractions are not entity values, and the remaining extractions may be provided to the second subset of the second ML models 134). Eliminating extractions that are unlikely to be entities before determining the probability that the extractions are the category-specific entities may be faster or may utilize fewer processing resources or memory footprints for the subsets of the second ML models 134 as compared to determining multiple probability scores for each extraction independent of the likelihood the extraction is an entity.

After the annotator 132 generates the annotation data 118, the annotator 132 may provide the annotation data 118 to the summarizer 136 to summarize the input document. For example, the summarizer 136 may generate the document summary 122 that corresponds to the input document. The document summary 122 may be a category-specific summary that corresponds to the document category 120 and that includes specific information from the input document (e.g., the entity values indicated by the annotation data 118). For example, if the document category 120 is a lease, the document summary 122 may be a summary of a lease (e.g., the input document) with specific information, such as party names, dates, etc., from the input document.

The summarizer 136 may generate the document summary 122 based on the annotation data 118 and the document category 120. In some implementations, the summarizer 136 may summarize the input document using the third ML models 138. To illustrate, the summarizer 136 may provide the annotation data 118 to the third ML models 138 to generate the document summary 122. For example, based on the third ML models 138 corresponding to the document category 120, the summarizer 136 may select the third ML models 138 (from multiple category-specific ML models, as further described herein) and provide the annotation data 118 as input to the third ML models 138. The third ML models 138 may generate summaries based on annotation data associated with documents having the document category 120.

The document summary 122 may include text, not-text elements (e.g., images, logos, tables, designs, graphics, colors, headings, sub-headings, etc.), or a combination thereof. For example, the document summary 122 may include a category-specific heading, a category-specific graphic, and text that summarizes the input document. In some implementations, the document summary 122 may include entity values and category-specific static text and non-text. For example, if the document category 120 is a lease, the document summary 122 may include a heading that includes a title "Lease Summary" underlined and in a particular font, in addition to a few sentences (e.g., one, two, or three sentences, as non-limiting examples) that includes static text summarizing information common to all leases and the entity values from the input document (e.g., included in the annotation data 118). In some implementations, summaries for the same document category differ only in the entity values included in the document summaries. In some other implementations, summaries of different documents having the same document category may differ in ordering of the entity values and the static text or in the static text that is included in the summaries, which may be based on the entity values (e.g., a summary of a lease with a company name for Party A may be slightly different than a summary of a lease with an individual's name for Party A, as a non-limiting example). Additional details of document summaries are further described herein with reference to FIG. 7.

After generation of the document summary 122, the document processing device 102 may generate an output 152 that includes the document summary 122. In some implementations, the output 152 may be provided to the user device 140 to enable display of a graphical user interface (GUI) at the user device 140 (or the output 152 may be used to cause display of a GUI at the document processing device 102). The GUI may visually display one or more document summaries, including the document summary 122. For example, the GUI may display the text (and any non-text elements) included in the document summary 122. Additionally or alternatively, the output 152 may be provided to the databases 142 for storage, or the document summary 122 may be stored at the document processing device 102 (e.g., at the memory 106 or a data storage device integrated in or coupled to the document processing device 102). The document summary 122 may be stored at the databases 142 for use in providing summaries to users, such as via the user device 140, for providing more efficient indexing and searching of documents stored in the databases 142, for generating multi-document reports, or for any other purpose for which document summaries may be beneficial.

The document processing device 102 may similarly categorize and summarize other documents. For example, the document processing device 102 may receive second input data (e.g., from the user device 140 or the databases 142) that represents a second document having a different document category than the document category 120. The categorizer 128 may generate additional feature data based on the second input data and provide the additional feature data to the first ML models 130 to categorize the second input document as having a second document category that is different from the document category 120. Based on the second document category, the second input document may be processed differently than the input document. For example, the annotator 132 and the summarizer 136 may access different ML models to annotate and summarize the second input document based on the second input document belonging to the second document category (and not the document category 120). In some implementations, the annotator 132 and the summarizer 136 may include or be configured as multiple distinct category-specific summarization pipelines, as further described herein with reference to FIG. 3.

To illustrate the processing of different categories of documents, the annotator 132 may generate fourth feature data based on the second input data and provide the fourth input data to a fourth set of ML models to generate second annotation data. For example, the annotator 132 may select the fourth ML models (from multiple category-specific ML models including the second ML models 134) based on the fourth ML models corresponding to the second document category. The fourth set of ML models may be configured to generate annotation data, similar to the second ML models 134, but for documents of the second document category. The summarizer 136 may provide the second annotation data to a fifth set of ML models to generate a second document summary that corresponds to the second input document. For example, the summarizer 136 may select the fifth ML models (from multiple category-specific ML models including the third ML models 138) based on the fifth ML models corresponding to the second document category. The fifth set of ML models may be configured to generate summaries for documents of the second document category. As an illustrative example, if the second category is meeting notes, the second annotation data may include entity values extracted from the second input document for the entity labels Meeting Date, Meeting Location, Attendee Count, First Speaker, First Subject, Second Speaker, Second Subject, and Vote Results, and the second document summary may include information common to all meetings and the entity values included in the second annotation data. In this manner, different ML models trained for category-specific annotation and summarization may be used to annotate and categorize documents in different categories.

The first ML models 130, the second ML models 134, and the third ML models 138 (and any other ML models used by the document processing device 102) may be trained by the document processing device 102 or may be received from other devices that train the ML models (e.g., configuration parameters corresponding to trained ML models may be received and used to configure the ML models at the document processing device 102). In some implementations, the training engine 126 may train one or more of the first ML models 130, the second ML models 134, and the third ML models 138 based on the training data 110. The training data 110 may represent labeled and annotated documents, such as documents of the multiple predefined document categories that are labeled by category and that are annotated to indicate the entity values within the documents. The training engine 126 may generate the training data 110 based on labeled document data 154 from the databases 142, which may include text data, image data, electronic document data, other data types, or a combination thereof, that represents annotated documents of each of the multiple predefined document categories.

In some implementations, the training data 110 may include a first portion (e.g., first training data) that is used by the training engine 126 to train the first ML models 130. The first training data may be generated based on multiple labeled documents that correspond to the predefined document categories. To illustrate, the labeled documents may include an identifier or metadata that indicates to which category of the predefined document categories that each labeled document is assigned. The labeling process may be performed by one or more document experts, by an automated labeling application, as part of the initial generation by a document creation application, or a combination thereof. As a non-limiting example, if the predetermined document categories include legal documents, HR documents, financial documents, and marketing documents, the first training data may be based on multiple labeled legal documents, multiple labeled HR documents, multiple labeled financial documents, and multiple labeled marketing documents. The first training data may be generated by extracting features from each of the labeled documents, as described above with reference to the categorizer 128. Training the first ML models 130 based on the first feature data may configure the first ML models 130 to categorize documents based on underlying similarities between features of documents assigned to the same category and underlying differences between features of documents assigned to different categories.

Additionally or alternatively, the training data 110 may include a second portion (e.g., second training data) that is used by the training engine 126 to train the second ML models 134. The second training data may be generated based on multiple labeled and annotated documents that correspond to the predefined document categories and are annotated using category-specific annotations. To illustrate, the labeled and annotated documents may include an identifier or metadata that indicates to which category of the predefined document categories that each labeled annotated document is assigned. Additionally, the labeled and annotated documents may include metadata that includes tags that indicate particular words or phrases in the documents are values of category-specific entities. The labeling and annotation process may be performed by one or more document experts, by an automated labeling application, as part of the initial generation by a document creation application, or a combination thereof. As a non-limiting example, if the predetermined document categories include leases, depositions, and complaints, the second training data may be based on multiple labeled and annotated leases, multiple labeled and annotated depositions, and multiple labeled and annotated complaints. In this example, the labeled and annotated leases may include annotation data (e.g., metadata) that tags particular words or phrases in the leases as being the name of Party A, the name of Party B, the duration of the lease, etc., and the labeled and annotated depositions may include annotation data that tags particular words or phrases as the name of Deposed Party, the name of Deposer, the date of the deposition, the topic of the deposition, the number of objections raised during the deposition, etc. The second training data may be generated by extracting features from each of the labeled and annotated documents, as described above with reference to the annotator 132. The second ML models 134 may be trained based on a subset of the second training data that corresponds to documents having a same category as the second ML models 134, and other ML models utilized by the annotator 132 may be similarly trained based on other category-specific subsets of the second training data. Training the second ML models 134 based on at least some of the second feature data may configure the second ML models 134 to identify words or phrases in documents of a particular category to tag as entity values in annotation data based on underlying relationships between features of input documents and the annotations.

Additionally or alternatively, the training data 110 may include a third portion (e.g., third training data) that is used by the training engine 126 to train the third ML models 138. The third training data may be generated based on one or more document summary templates (or reference document summaries) for the different predetermined document categories. To illustrate, one or more summary templates for each of the predefined document categories may be generated by one or more document experts, by an automated document management application, or a combination thereof. As a non-limiting example, if the predetermined document categories include leases, depositions, and complaints, the third training data may be based on one or more lease summary templates, one or more deposition summary templates, and one or more complaint summary templates. The third ML models 138 may be trained based on a subset of the third training data that corresponds to summary templates having a same category as the third ML models 138, and other ML models utilized by the summarizer 136 may be similarly trained based on other category-specific subsets of the third training data. Training the third ML models 138 based on at least some of the third feature data may configure the third ML models 138 to generate summaries of documents of a particular category based on annotation data from the annotator 132.

As described above, the system 100 supports summarization of unlabeled documents across multiple predefined document categories to be summarized with little to no user input. For example, the categorizer 128, the annotator 132, and the summarizer 136 may utilize specially trained ML models to automatically categorize, annotate, and summarize the input document represented by the input data 150. Additionally, the system 100 may generate document summaries, such as the document summary 122, that are more semantically precise and more readable (e.g., grammatically correct and similar to human-generated text) than document summaries generated by conventional systems. To illustrate, the second ML models 134 may be trained to provide category-specific annotation data, such as the annotation data 118, for documents of a particular category based on analysis of the documents as a whole, which may improve semantic precision of summaries generated based on the annotation data. Also, the system 100 may enable faster summarization of documents using fewer processing resources than conventional summarization systems due to the category-specific document summarization performed by the third ML models 138, which may be trained using a few (e.g., one to five) category-specific summary templates. The third ML models 138 (and category-specific ML models for other categories) may be trained using significantly fewer training documents as compared to the large volume of reference documents some conventional systems analyze to improve semantic understanding of documents. The document summaries, such as the document summary 122, generated by the system 100 may be used to support fast and accurate document indexing and searching for a variety of different document categories.

Figure 2:
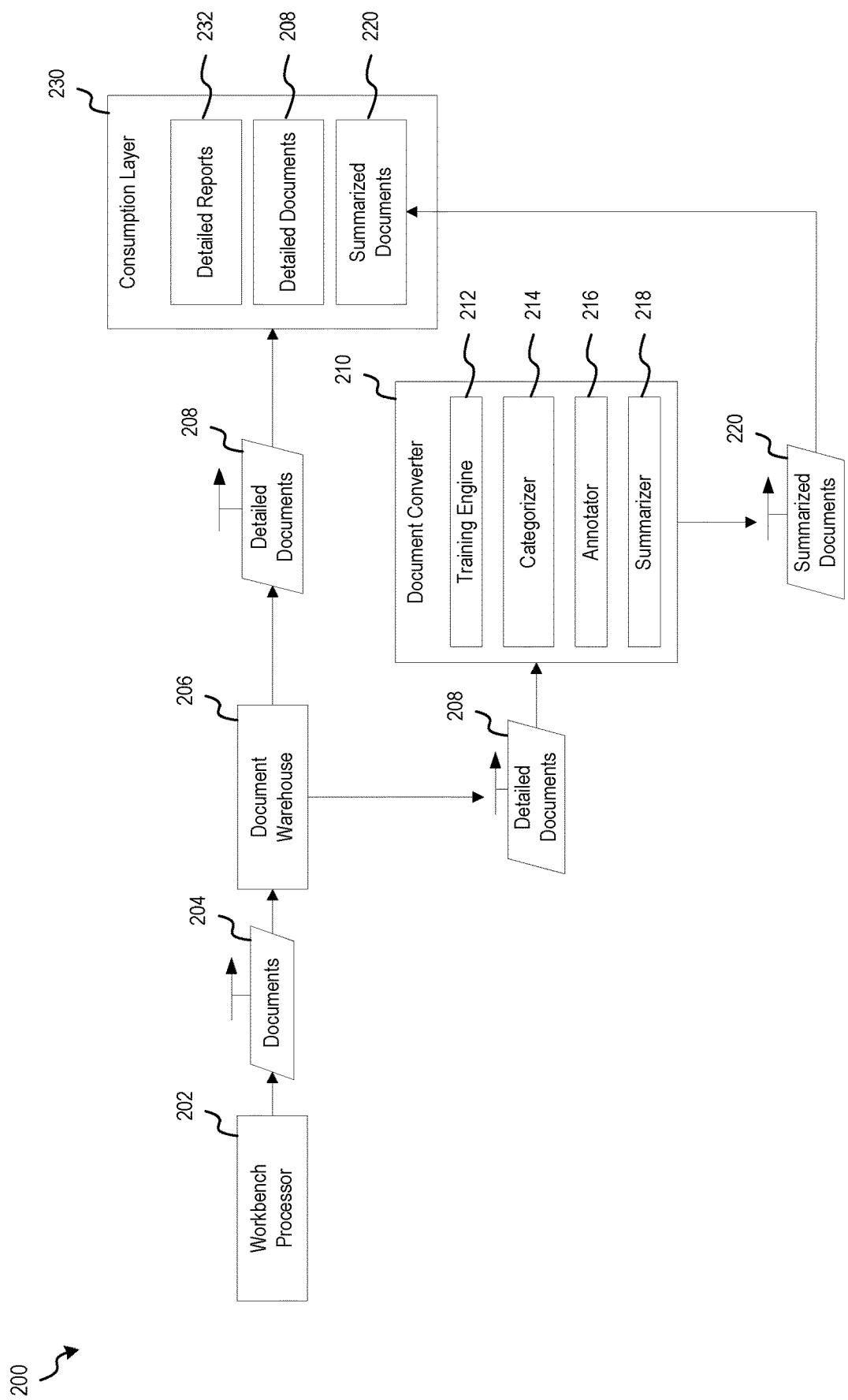
FIG. 2 is a block diagram of an example of a system that supports automated document processing and summarization according to one or more aspects.

Referring to FIG. 2, an example of a system that supports automated document processing and summarization (e.g., encapsulation) according to one or more aspects is shown as a system 200. The system 200 may be configured to receive documents and generate summarized documents corresponding to the received documents. In some implementations, the system 200 (or one or more components thereof) may include or corresponds to the system 100 (or one or more components thereof) of FIG. 1. As shown in FIG. 2, the system 200 includes a workbench processor 202, a document warehouse 206, a document converter 210, and a consumption layer 230.

The workbench processor 202 includes a device (or a processor thereof), such as a user device, a mobile device, a server, or the like, that is configured to execute or support a workbench application. As used herein, a "workbench" may refer to any specialized data use space for which documents may be managed and processed. To illustrate, a workbench may correspond to one or more categories of documents, one or more enterprises for which documents are managed, or other types of data use spaces. As non-limiting examples, the workbench processor 202 may support a legal document workbench, an inventory workbench, a financial workbench, a cross-domain workbench, an enterprise-specific workbench, or the like. The workbench processor 202 may generate documents 204 that correspond to the workbench supported by the workbench processor 202. For example, a legal document workbench may support user generation, editing, analyzation, and organization of legal documents such as leases, contracts, depositions, motions, exhibits, and the like. As another example, a manufacturing company workbench may support user generation, editing, analyzation, and organization of documents such as employee schedules, output reports, sales agreements, budgets, accounting documents, human resource documents, timecards, shipping contracts, and the like, associated with the manufacturing company. The documents 204 may include text data, image data, electronic document data (e.g., PDF or other document files), audio data, or a combination thereof, as non-limiting examples.

The document warehouse 206 may be configured to receive and store the documents 204 from the workbench processor 202, or other devices associated with an enterprise that maintains the document warehouse 206. The document warehouse 206 may also provide access to stored documents to other devices or systems, such as the document converter 210 and the consumption layer 230. As an example, the document warehouse 206 may provide detailed documents 208 to the document converter 210 and the consumption layer 230. The detailed documents 208 may be the documents 204 or documents generated based on the documents 204. For example, if the documents 204 include non-text data, the document warehouse 206 (or another component of the system 200) may perform an optical character recognition process on the documents 204 to generate the detailed documents 208.

The document converter 210 may be configured to receive the detailed documents 208 from the document warehouse 206 and to categorize and summarize the detailed documents 208. For example, the document converter 210 may be configured to generate summarized documents 220 based on the detailed documents 208. The document converter 210 may include a training engine 212, a categorizer 214, an annotator 216, and a summarizer 218. The training engine 212 may include or correspond to the training engine 126 of FIG. 1. The training engine 212 may be configured to generate training data for training one or more ML models included in or accessible to the categorizer 214, the annotator 216, the summarizer 218, or a combination thereof. The training data generated by the training engine 212 may include one or more labeled or annotated documents. The labels may indicate the category corresponding to the respective document. For example, based on the workbench processor 202 being a legal document workbench, the training engine 212 may be configured to generate training data based on one or more documents labeled as leases, contracts, depositions, motions, exhibits, and the like. The labeled documents produced by the training engine 212 may include annotations that indicate significant information corresponding to the labeled category of the document, also referred to as "entities." Each category of document may be associated with a category-specific group of entities which should be included in all documents of the category. For example, a labeled lease document may include annotations that indicate which words, phrases, etc., in the document correspond to lease-specific entities such as a lessor, a lessee, a term, a price, a pay frequency, and the like. The training data generated by the training engine 212 may also be based on category-specific document summary templates to enable training of ML models to generate category-specific summaries based on input annotation data. Although described as being included in the document converter 210, in some other implementations, the training engine 212 is omitted, and trained ML models (e.g., model configuration parameters) are received from another device that trains the ML models.

The categorizer 214 may be configured to categorize the detailed documents 208 into respective categories of a group of predefined document categories. In some implementations, the categorizer 214 may include or correspond to the categorizer 128 of FIG. 1. The predefined document categories may correspond to the particular workbench supported by the workbench processor 202. For example, if the workbench processor 202 supports a legal document workbench, the predefined document categories may include leases, contracts, depositions, motions, exhibits, and the like. As another example, if the workbench processor 202 supports a financial document workbench, the predefined document categories may include purchase agreements, fund transfer receipts, account balances, budgets, invoices, payment receipts, tax documents, and the like. In some implementations, the categorizer 214 may include or access first ML models configured to categorize input documents into the predefined document categories. The categorizer 214, utilizing the first ML models, may assign a category label to each of the detailed documents 208. The assignment of the label may be based on information contained within the documents. As discussed in more detail below with reference to FIGS. 4 and 5, the categorizer 214 may be configured to identify and extract particular features from the detailed documents 208. Based on the extracted features (e.g., by providing the features as input to the first ML models), the categorizer 214 may each of the detailed documents 208 to a respective document category. In some implementations, the categorizer 214 may determine a probability that an input document (e.g., one of the detailed documents 208) belongs to each of the predefined categories based on underlying similarities between the input document and documents of each category. In such implementations, the categorizer 214 may label a document with the category associated the highest probability of the determined probabilities.

The annotator 216 may be configured to generate category-specific annotation data associated with the detailed documents 208 (e.g., to annotate the detailed documents 208). In some implementations, the annotator 216 may include or correspond to the annotator 132 of FIG. 1. Category-specific annotation data includes entity values for one or more category-specific entities. In some implementations, the annotator 216 may include or access second ML models configured to generate category-specific annotation data. As discussed in more detail below with regard to FIGS. 4 and 6, the annotator 216, utilizing the second ML models, may be configured to generate annotation data based on input documents in a category-specific manner. In some implementations, the annotator 216 may access different ML models for different categories of input documents (as determined by the categorizer 214), and each set of ML models may be configured to generate annotation data for documents having a single respective category. For example, if a document is labeled as a lease by the categorizer 214, the annotation data may include the name of a first party, the name a second party, a time period that is a duration of the lease, a day of a starting date of the lease, and the amount of a payment value from the second party to the first party to pay for the object of the lease. The annotator 216 may evaluate the input document for qualitative word features, quantitative word features, pixel features, or a combination thereof, for use in determining the annotation data. For example, the annotator 216 may generate or extract feature data based on the input documents, as further described below with reference to FIG. 6, and the feature data may be provided as input to the second ML models to generate the annotation data. In some implementations, the annotator 216 may determine probabilities that a word or phrase (e.g., an extraction) from the input document is a value of each entity from a category-specific list of entities (or is not an entity). In some such implementations, the word or phrase may be determined to be the entity value of the entity associated with the highest probability. As an illustrative example of annotating, for a document labeled as a lease, the annotator 216 may tag the words "BuyTown Inc." in the input document as being the value of an entity named "first party" and may tag the specific phrase "Ten Years" as being the value of an entity named "lease term." To further illustrate, "BuyTown Inc." may be tagged as the entity value of the entity named "first party" based on the probability associated with "first party" being greater than probabilities associated with the other category-specific entities and with no entity for the words "BuyTown Inc."

The summarizer 218 may be configured to generate category-specific summaries of the detailed documents 208 (e.g., to summarize the detailed documents 208). In some implementations, the summarizer 218 may include or correspond to the summarizer 136 of FIG. 1. In some implementations, the summarizer 218 may include or access third ML models to train the detailed documents 208 based on associated entity data generated by the annotator 216 and the categories determined by the categorizer 214. The summarizer 218, by utilizing the third ML models, may be configured to generate summarized documents 220 corresponding to the detailed documents 208 in a category-specific manner. In some implementations, the summarizer 218 may be configured to access different ML models for different categories of input documents, and each set of ML models may be configured to generate summaries for documents of a single respective category. For example, third ML models may be configured to output summaries for a particular category of documents, and these summaries may be designed and tailored to information common to the respective document category. Other ML models may be similarly configured for other categories of documents. As a non-limiting example, one set of ML models may be configured to output summaries of leases, and another set of ML models may be configured to output summaries of depositions.

To generate the summarized documents 220, the summarizer 218 may generate category specific summaries that included document-specific information indicated by the annotation data associated with the detailed documents 208. To illustrate, if a document is categorized as a lease, the summarizer 218 may generate summary of a lease that explains static information common to all leases, such as an indication that a lease involves a payment between two parties for a temporary leasing of a particular object from one party to the other party, as well as document-specific information such as who (e.g., a first party and a second party indicated by the annotation data) agreed to the lease, when (e.g., a starting date indicated by the annotation data) the lease was agreed upon, the duration (e.g., a duration indicated by the annotation data) of the lease, and the value (e.g., a payment amount indicated by the annotation data) of the lease. Instead of merely listing the entity values from the annotation data, the summarized documents 220 may include grammatically correct and semantically meaningful sentences based on the tagged entity values and the category-specific text associated with the document category. For example, if the input document is a lease, the category-specific text may include "Rights transferred according to this lease are to extend, subject to additional agreements, for a term of @duration," where "@duration" is an name of the category-specific entity "Duration." In this example, the tagged entity value for the entity "Duration" may include "ten years" such that the summarized document presents the information as "Rights transferred according to this leas are to extend, subject to additional agreements, for a term of ten years." Summaries for other document categories may include different category-specific static text and entity values for different category-specific entities.

The consumption layer 230 may be configured to receive and consume documents to enable various functionality. For example, the consumption layer 230 may receive the detailed documents 208 from the documents warehouse 206 and the summarized documents 220 from the document converter 210. The various functionality supported by the consumption layer 230 may include generating reports, indexing stored documents based on summaries, configuring searching processes, other operations, or a combination thereof. For example, the consumption layer 230 may generate the detailed reports 232 based on the summarized documents 220. The detailed reports 232 may include one or more multi-document reports that include at least some of the summarized documents 220 (or portions thereof). Thus, the detailed reports 232 may be easier and faster to review by a user than the detailed documents 208, or some combination thereof. As another example, the consumption layer 230 may store (or have access to) the summarized documents 220 and use the summarized documents 220 to index the detailed documents 208. For example, a query for documents may be run against the summarized documents 220 instead of the detailed documents 208, which may be faster and use fewer processing resources than running the query against the detailed documents 208. Because the summarized documents 220 include highly relevant information, any query that fails for the summarized documents 220 would likely fail for the detailed documents 208.

As described with reference to FIG. 2, the system 200 supports workbench functionality for multiple categories of documents more efficiently and using few resources than conventional systems. For example, by using the summarized documents 220 at the consumption layer 230, reporting, indexing, and searching of documents may be faster and use fewer processing resources than conventional systems that do not use summarized documents. Additionally, the summarized documents 220 generated by the document converter 210 may be more informative and semantically meaningful due to the category-specific annotation and summarization than summarized documents generated by other automated summarization systems.

Figure 3:
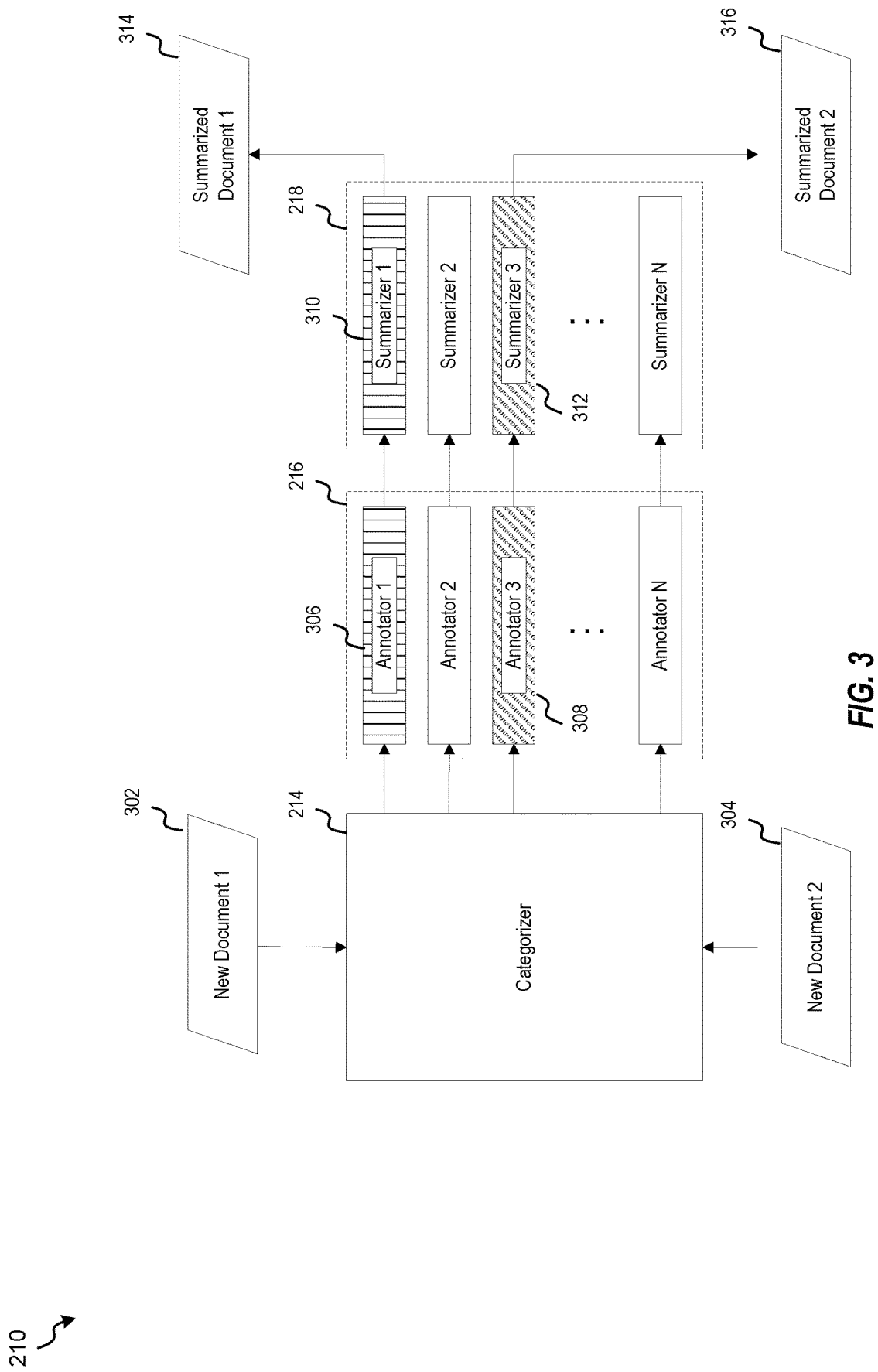
FIG. 3 is a block diagram of an example of the document converter of FIG. 2.

Referring to FIG. 3, an example of the document converter 210 of FIG. 2 is shown. The document converter 210 may be configured to receive documents and generate summarized documents that correspond to the category of the received documents. As shown in FIG. 3, the document converter 210 includes the categorizer 214, the annotator 216, and the summarizer 218.

During operation of the document converter 210, the categorizer 214 may receive a first new document 302 and a second new document 304. The first new document 302 and the second new document 304 may include unlabeled documents that correspond to different predefined document categories. For example, the first new document 302 may be a lease and the second new document 304 may be a deposition. As discussed in detail above with reference to FIG. 2, the categorizer 214 may utilize a first set of one or more ML models ("first ML models") to assign a category label corresponding to the first new document 302 and a category label corresponding to the second new document 304. To further illustrate, the categorizer 214 may generate first feature data based on the first new document 302, and responsive to receiving the first feature data as input, the first ML models, and thus the categorizer 214, may output a first category label corresponding to the first new document 302. Additional details of the feature data are described below with reference to FIGS. 4 and 5. The categorizer 214 may similarly output a second category label corresponding to the second new document 304 based on feature data generated based on (e.g., extracted from) the second new document 304. For example, the categorizer 214 may label the first new document 302 as a lease and may label the second new document 304 as a deposition. In some implementations, the first ML models may output probability scores indicating the likelihood that the first new document 302 and the second new document 304 correspond to each of the predefined document categories, and the categorizer may output the category associated with the highest probability score, as further described below with reference to FIG. 5.

Categorizing input documents enables category-specific processing and summarizing within the document converter 210. In some implementations, input documents such as the first new document 302 and the second new document 304 may be provided to category-specific pipelines by the categorizer 214 based on the determined categories. For example, if the first new document 302 is assigned to a first category (e.g., leases), the categorizer 214 may provide the first new document 302 to a first pipeline associated with the first category, and if the second new document 304 is assigned to a third category (e.g., depositions), the categorizer 214 may provide the second new document 304 to a third pipeline associated with the third category. In such implementations, if there are N predefined document categories, the categorizer 214 may provide input documents to one of N category-specific pipelines. Each category-specific pipeline may include or correspond to respective components of the annotator 216 and the summarizer 218. As shown in FIG. 3, the first new document 302 may be provided to the first category-specific pipeline (indicated by horizontal shading), and the second new document 304 may be provided to the third category-specific pipeline (indicated by diagonal shading). Although four category-specific pipelines are shown in FIG. 3, in other implementations, fewer than four or more than four category-specific pipelines may be included in the document converter 210 (e.g., N may be any integer greater than one).

The annotator 216 may include one or more category-specific annotators such as a first annotator 306 and a third annotator 308. Each category-specific annotator of the annotator 216 may utilize a set of one or more category-specific ML models ("second ML models") to generate category-specific annotation data for received input documents. For example, the first annotator 306 may utilize different second ML models than third annotator 308. The category-specific second ML models may be trained separately using distinct training data to generate category-specific annotation data based on feature data associated with input documents. For example, a set of second ML models utilized by the first annotator 306 may be trained using training data that is generated based on documents corresponding to the first category and a set of second ML models utilized by the third annotator 308 may be trained using training data that is based on documents corresponding to the third category. The category-specific annotation data generated by each of the first annotator 306 and the third annotator 308 may include word and phrases (e.g., entity values) tagged by the annotators that are highly relevant and informative for summarizing documents of the respective categories (e.g., correspond to category-specific entities). For example, the annotator 216 may receive the labeled first new document 302 and the labeled second new document 304 from the categorizer 214. Based on the first new document 302 being labeled a lease, a lease-specific annotator (e.g., the first annotator 306) may receive the first new document 302 and generate annotation data indicating entity values for lease-specific entities, such as "party 1," "party 2," "lease date," "lease duration," etc. To further illustrate, the first annotator 306 may tag "Bob" in the first new document 302 as corresponding to an entity named "party 1" and may tag "Jane" as corresponding to an entity named "party 2." As another example, based on the second new document 304 being labeled as a deposition, a deposition-specific annotator (e.g., the third annotator 308) may receive the second new document 304 and generate annotation data indicating entity values for deposition-specific entities, such as "questioned party," "deposition date," "deposing party," "objections," etc. To further illustrate, the third annotator 308 may tag "Mike" in the second new document 304 as corresponding to an entity named "questioned party" and may tag "January 1" as corresponding to an entity named "deposition date." The labeled new documents may be provided to the category-specific annotators (e.g., the category-specific pipelines) by the categorizer 214 or by the annotator 216 based on the respective category labels.

The summarizer 218 may receive first annotation data corresponding to the first new document 302 and second annotation data corresponding to the second new document 304. As discussed above in more detail with reference to FIG. 2, the summarizer 218 may generate a category-specific summarized document based on the annotation data. In some implementations, the summarizer 218 may include one or more category-specific summarizers such as a first summarizer 310 and a third summarizer 312. Each category-specific summarizer of the summarizer 218 may utilize a set of one or more category-specific ML models ("the third ML models) to generate category-specific summaries for the input documents based on the corresponding annotation data. For example, the first summarizer 310 may utilize different third ML models than the third summarizer 312. The category-specific third ML models may be trained separately using distinct training data to generate category-specific summaries based on input annotation data. For example, a set of third ML models utilized by the first summarizer 310 may be trained based on training data generated based on one or more document summary templates (or document summaries) that correspond to a first category and a set of third ML models utilized by the third summarizer 312 may be trained based on training data generated based on one or more document summary templates (or document summaries) that correspond to a third category. The summarized documents generated by each of the first summarizer 310 and the third summarizer 312 may include grammatically correct sentences including information relevant for the respective category. For example, the first summarizer 310 may be specific to a lease and may receive the first annotation data corresponding to the first new document 302 based on the first new document 302 being labeled a lease. The first summarizer 310 may generate a first summarized document 314 that includes the words or phrases from the first new document 302 that are tagged as lease-specific entity values in the first annotation data. For example, the first summarized document 314 may include the text "Bob is the lessor and Jane is the lessee. Bob and Jane have agreed to the leasing of the real estate located at 867 Rio Drive. The term of this lease is for one year." As another example, the third summarizer 312 may be specific to a deposition and may receive the second annotation data corresponding to the second new document 304 based on the second new document 304 being labeled a deposition. The third summarizer 312 may generate a second summarized document 316 that includes the words or phrases from the second new document 304 that are tagged as deposition-specific entity values in the second annotation data. For example, the second summarized document 316 may include the text "A deposition for case #123 was taken on January 1. The questioned party was Mike and the deposing party was Steve. Mike was deposed regarding safety conditions in a company warehouse. No objections were raised."

As described with reference to FIG. 3, the document converter 210 supports categorization, category-specific annotation, and category-specific summarization of input documents. For example, the categorizer 214 may categorize input documents and provide the input documents to category-specific pipelines (e.g., category-specific components of the annotator 216 and the summarizer 218). The various ML models utilized by the different category-specific annotators and the category-specific summarizers may provide improved annotation and summarization as compared to training ML models to perform category-agnostic annotation and summarization. Additionally, the category-specific ML models may be less complex and may be trained using less training data than category-agnostic ML models.

Figure 4:
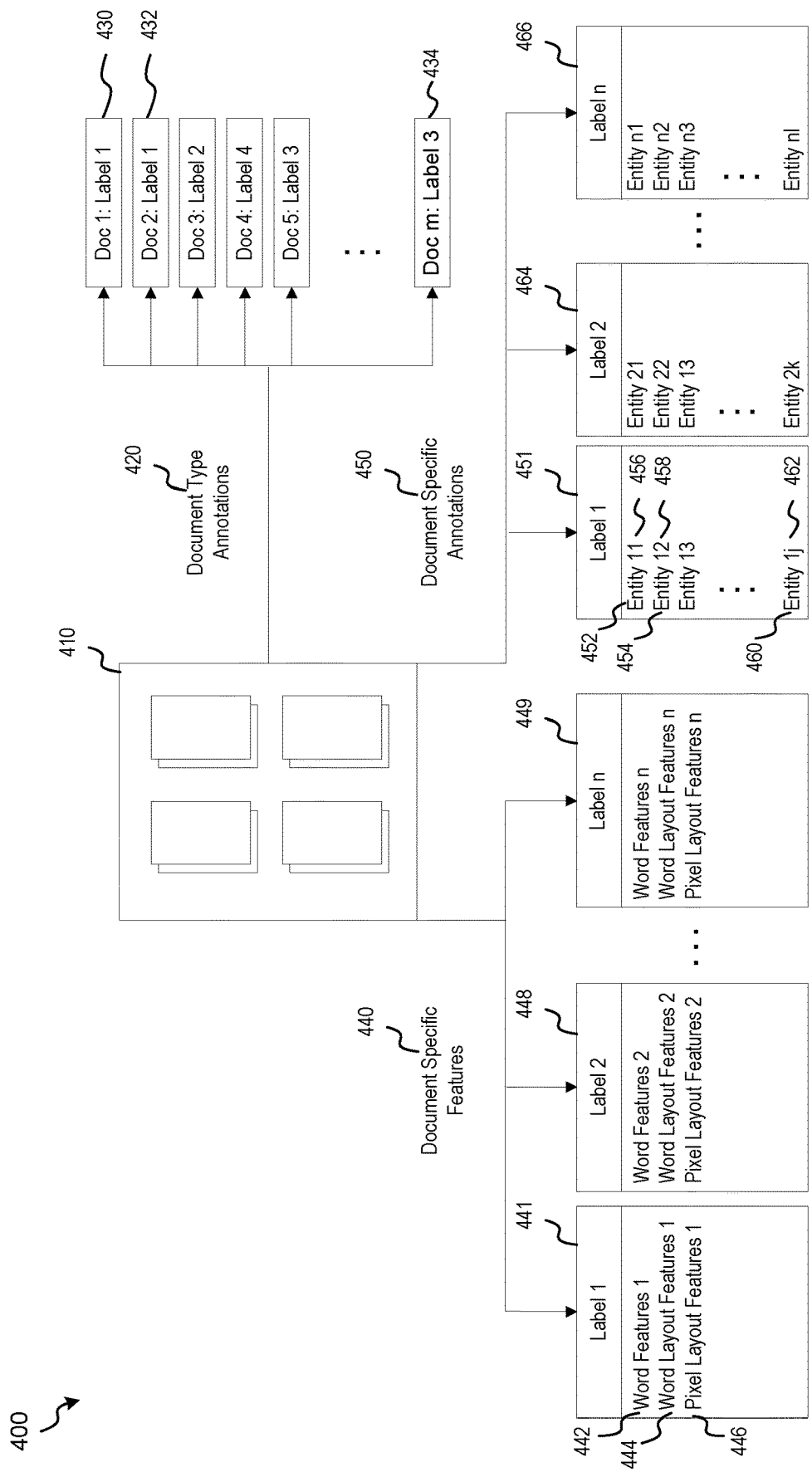
FIG. 4 is a block diagram of examples of features extracted from documents according to one or more aspects.

Referring to FIG. 4, examples 400 of features extracted from documents according to one or more aspects are shown. The examples 400 may include documents 410, which are used to generate document type annotations 420, document-specific features 440, and document-specific annotations 450. In some implementations, the documents 410 may include or correspond to the labeled document data 154 of FIG. 1, and the document type annotations 420, the document-specific features 440, and the document-specific annotations 450 may include or correspond to the training data 110 of FIG. 1. Additionally or alternatively, the documents 410 may be used by the training engine 212 of FIG. 2 to train ML models of the categorizer 214, the annotator 216, the summarizer 218, or a combination thereof.

The documents 410 may include multiple labeled and annotated documents that each correspond to one of multiple predefined categories. For example, the documents 410 may include m documents and the predefined categories may include n categories, where m and n may each be any integer greater than one. As described above, the predefined categories may include broad categories that each include multiple specific types of documents, such as a legal documents category, a marketing documents category, a financial documents category, and the like, or the predefined categories may include narrower, specific types of documents, such as leases, depositions, complaints, motions, contracts, wills, and the like. The various categories may be defined by a workbench application, as described with reference to FIG. 1. In some implementations, the documents 410 include multiple documents associated with each of the predefined categories, such as a first group of documents associated with a first category, a second group of documents associated with a second category, a third group of documents associated with a third category, and an nth group of document associated with an nth category.

Each of the documents 410 may be labeled based on a respective category of the document. For example, metadata (or some other type of indicator) associated with one of the documents 410 that corresponds to the first category may include a first label ("Label 1"). Similarly, metadata associated with one of the documents 410 that corresponds to the second category may include a second label ("Label 2"). The documents 410 may be labeled by one or more document experts that read the documents 410 and provide user input to label the documents 410, by an automated document labeling application that analyzes documents to assign labels, by a document creation application that includes a label when generating an electronic document, by other document labeling techniques, or a combination thereof. In some implementations, the documents 410 are also annotated. Annotated documents include associated annotation data (e.g., metadata) that tags words or phrases (or any elements) in the documents as being entity values for entities. As described above, entities may include any words or phrases that are highly relevant and informative for summarizing documents. The entities may be category-specific. To illustrate, entities that are tagged for documents of the first category may be different than entities that are tagged for documents of the second category. As an illustrative example, if the first category is leases and the second category is depositions, entities tagged in documents of the first category may include "lessor," "lessee," "lease date," "lease duration," "lease price," and the like, and entities tagged in documents of the second category may include "deposition date," "deposed party," "deposing party," "deposition subject," "objections," and the like.

The document type annotations 420 may include the labels associated with each of the documents. For example, the document type annotations 420 may include a first label 430, a second label 432, and an mth label 434. Although six document labels are illustrated in FIG. 4, in other implementations, m may be any integer greater than one. Each of the document type annotations 420 may indicate a category of the multiple predefined categories to which a respective document of the documents 410 is assigned. For example, the first label 430 may indicate that a first document ("Doc 1") is assigned to the first category ("Label 1"), the second label 432 may indicate that a second document ("Doc 2") is assigned to the first category, a third document label may indicate that a third document ("Doc 3") is assigned to the second category ("Label 2"), and the mth label 434 may indicate that an mth document ("Doc m") is assigned to a third category ("Label 3").

The document-specific features 440 may include the various features that are generated based on the documents 410. In some implementations, at least some of the features are generated by tokenizing the documents 410 into matrix representations using a bag of words approach for each of the documents 410. The matrix representations may indicate the compactness of the entities in the documents. Additionally or alternatively, the matrix representations (e.g., matrix-based structures) may support a high-level numeric representation of the frequency of the words in a corpus of the documents 410. These frequencies may be useful when generated for unlabeled input documents to assign confidence values (e.g., probability scores) to entity determinations, as further described with reference to FIG. 6.

The document-specific features 440 may include word features, word layout features, pixel layout features, or a combination thereof, as non-limiting examples. The word features may include word counts (e.g., counts of each distinct word or phrase (e.g., string) within each document), word ratios (e.g., ratios of the counts of the words or phrases to a total corpus of words or phrases in the documents 410), classifications (e.g., significant or insignificant words), word lengths, capital letter counts, and the like. In some implementations, word counts (e.g., frequency) of each word in a training document may be determined and tagged to the corresponding word, and a log transformation may be applied to each word count to make the mathematical function smoother. The results may be indicative of the importance of the words in the document. Additionally, a ratio of presence may be calculated for each word using the total document count (e.g., a ratio of the number of the documents 410 that include a particular word or phrase to the total number of documents included in the documents 410 (or the total number of documents assigned to the same category as the document from which the features are being generated)). These two measures (e.g., the log value and the ratio of presence for each word) may be summarized for each word in the document to vectorize the document. Thus, in some implementations, the word features may include log values of word counts and ratios of presence for each word (or phrase) in a document.

The word layout features may include pixel locations of words within pixel arrays associated with the documents 410, distances between words, word dimensions, sentence indices, and the like. For example, a pixel array representing each of the documents 410 (or each page of each of the documents 410) may be generated, and pixel locations of words (e.g., of vertices of bounding polygons of the words, centroids of the words, etc.) may be determined as location coordinates with reference to the respective pixel array associated with the document (or the page(s) of the document) that includes the words. Distances between words may be determined based on the pixel locations of the words, based on a difference between indices of sentences that include the words, using other techniques, or a combination thereof. In some implementations, the word features and the word layout features may include qualitative features, such as lengths of words, percentages of capital letters, fuzzy representations of the words, and the like, and quantitative features. In some such implementations, the quantitative features may be determined by representing an individual corpus of a document as a grid-plane on which the words are placed, which may capture the positional significance of each word. For example, the quantitative features may include locations within the grid-plane of bounded polygons, such as optimal four-sided polygons, that bound the words, as well as locations within the grid-plane of centroids of the words. By including these quantitative features, ML models that are trained based on the training data may capture improved word contextualization (as compared to being trained using the qualitative features without the quantitative features), which can improve recognition of the annotators described herein with reference to FIGS. 1-3 and 6.

The pixel layout features may include pixel locations of non-word elements within the pixel arrays associated with the documents 410, distances between non-word elements, classifications of non-word elements, dimensions of non-word elements, and the like. For example, pixel locations of vertices, centroids, or other points of interest of non-word objects may be determined with reference to pixel arrays of the documents (or page(s) of the documents) that include the non-word elements. Dimensions, distances, and other layout features may be similarly determined using the pixel arrays and the pixel locations. The non-word elements may include visual objects that do not include text or text, due to formatting such as font, bold, italics, underlining, font size, text effects, or the like, is intended to serve as both textual information and a visual or design object. For example, the non-word objects may include images, graphics, tables, lines, bullets, designs, logos, colors, headings, sub-headings, and the like. In some implementations, the non-word objects may be analyzed to generate a three-dimensional (3D) matrix structure for each of the documents 410. Each cell in one of the 3D matrix structures may store information about a corresponding non-word object in a 3D tuple structure. The 3D matrix structure (and 3D tuple structures stored therein) may capture positional variability for unique non-word objects across different documents (e.g., of the same category or across different categories).

The document-specific features 440 may be grouped into category-specific groups of features. For example, the document-specific features 440 may be grouped into a first group of features 441, a second group of features 448, and an nth group of features 449. Each group of features may include the feature data generated based on (e.g., extracted from) one or more documents of the documents 410 that are labeled with the same category. For example, the first group of features 441 may include features from documents of the first category (e.g., Label 1), the second group of features 448 may include features from documents of the second category (e.g., Label 2), and the nth group of features 449 may include features from documents of the nth category (e.g., Label n). Each group of features may include word features, word layout features, pixel layout features, or a combination thereof. As an illustrative example, the first group of features 441 may include a first set of word features 442 (e.g., word features from documents of the first category), a first set of word layout features 444 (e.g., word layout features from documents of the first category), and a first set of pixel layout features 446 (e.g., pixel layout features from documents of the first category). Each set of features included in a category-specific group may include feature values across multiple documents for a common set of features. For example, the first set of word features 442 may include first word log values from the first document (e.g., Doc 1), first word presence ratios from the first document, second word log values from the second document (e.g., Doc 2), and second word presence ratios from the second document if the word features associated with the first category are word log values and word presence ratios and if the first document and the second document are assigned to the first category (e.g., Label 1), as shown in FIG. 4. In some implementations, the word features, the word layout features, the pixel layout features, or a combination thereof, associated with different categories may be different from one another. For example, the first set of word features 442 included in the first group of features 441 may include different word features than second word features ("Word Features 2") included in the second group of features 448, such as the first set of word features 442 including word log values and the second word features including word presence ratios. Alternatively, the word features, the word layout features, the pixel layout features, or a combination thereof, associated with different categories may be the same for two or more different categories. For example, the first set of pixel layout features 446 included in the first group of features 441 may include the same pixel layout features as nth pixel layout features ("Pixel Layout Features n") included in the nth group of features 449, such as the first set of pixel layout features 446 and the nth pixel layout features each including pixel locations of a centroid of a header.

The document-specific annotations 450 may include the entity names and respective entity values that are tagged in the documents 410 (e.g., that are included in the associated entity data). The document-specific annotations 450 may be category-specific, such that documents from different categories are annotated to tag different entities. In some implementations, training based on annotation data may enable configuration of a multi-label classification model (e.g., one or more ML models trained to perform multi-label classification). Each word or phrase in each of the documents 410 is tagged (e.g., by document experts, by automated or semi-automated systems, or a combination thereof)

with an entity name (e.g., a label) to which the word or phrase is an entity value or with a non-entity label (e.g., no label). Although described as each word or phrase being tagged, in some implementations, at least some words or phrases may be not be tagged, and these words or phrases are treated as though they are tagged with a non-entity label (e.g., no label may default to non-entity). Thus, the one or more ML models may be trained as a multi-factor linguistic model that tags words or phrases to be classified as one or more entities (e.g., true labels) or not (e.g., no label).

The document-specific annotations 450 may be grouped into category-specific groups of annotations (e.g., entity names and values). For example, the document-specific annotations 450 may be grouped into a first group of annotations 451, a second group of annotations 464, and an nth group of annotations 466. Each group of annotations may include the annotation data associated with one or more documents of the documents 410 that are labeled with the same category. For example, the first group of annotations 451 may include annotation data associated with documents of the first category (e.g., Label 1), the second group of annotations 464 may include annotation data associated with documents of the second category (e.g., Label 2), and the nth group of annotations 466 may include annotation data associated with documents of the nth category (e.g., Label n). Each group of annotations may include entity names associated with a respective category and entity values corresponding to the entity names in one or more of the documents 410 assigned to the respective category.

As an illustrative example, the first group of annotations 451 may include a first entity name 452 and first entity values 456 (e.g., words or phrases tagged with the first entity name 452 from documents of the first category), a second entity name 454 and second entity values 458 (e.g., words or phrases tagged with the second entity name 454 from documents of the first category), and a jth entity name 460 and jth entity values 462 (e.g., words or phrases tagged with the jth entity name 460 from documents of the first category). To further illustrate, if the first category is leases and the first document (Doc 1) and the second document (Doc 2) are assigned to the first category, the first entity name 452 may include "lessor," the first entity values 456 may include "Rob Smith" from the first document and "Sunshine Rentals, LLC" from the second document, the second entity name 454 may include "lessee," the second entity values 458 may include "Jason Turner" from the first document and "Cassie Folk" from the second document, the jth entity name 460 may include "lease duration," and the jth entity values 462 may include "two weeks" from the first document and "one year" from the second document.

In some implementations, the number of entities annotated for different categories may be different from one another, the entity names annotated for different categories may be different from one another, or both. For example, the first group of annotations 451 may include j annotation names, the second group of annotations 464 may include k annotation names, and the nth group of annotations 466 may include l annotation names, where j, k, and l may each be different positive integers. Alternatively, two or more of j, k, and l may be the same positive integer. As another example, the first entity name 452 included in the first group of annotations 451 may be different than an entity name included in the second group of annotations 464 (e.g., the first entity name 452 may be "lessor" and the first entity name included in the second group of annotations 464 may be "deposed party"). In some other implementations, the number of annotation names, the annotation names, or both, may be the same for two different categories. For example, if the first category is June purchase receipts and the second category is July purchase receipts, the first group of annotations 451 and the second group of annotations 464 may include the same entity names (e.g., "purchaser," "payment amount," "date," "seller," etc.), although non-annotated information in documents of the first category may be different from non-annotated information of documents of the second category.

Figure 5:
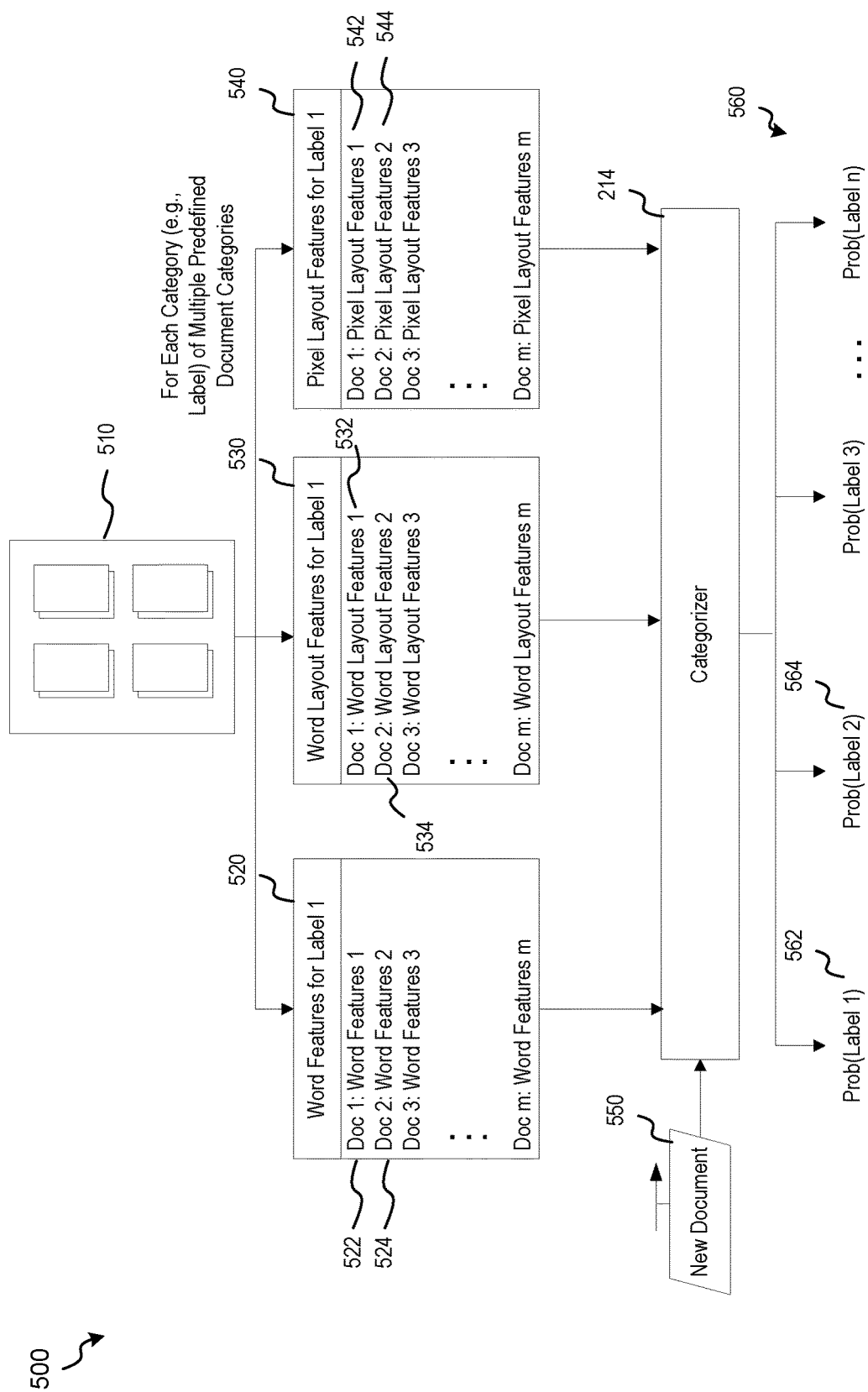
FIG. 5 is a block diagram of an example of the document categorizer of FIG. 2.

Referring to FIG. 5, an example 500 of the categorizer 214 is shown. As shown in FIG. 5, during a training process, the categorizer 214 may receive training data 510 for use in training one or more ML models that are included in or accessible to the categorizer 214. In some implementations, the ML models may include or correspond to the first ML models 130 of FIG. 1. The training data 510 may be generated based on multiple labeled documents of multiple predefined document categories, as further described above with reference to FIG. 4. The training data 510 may include various types of features extracted from the labeled documents, such as word features, word layout features, and pixel layout features, as a non-limiting example. The feature data may be labeled based on the corresponding category in the training data 510, such that the training data 510 may be used during a supervised learning process to train the categorizer 214. For example, the training data 510 may include a first group of word features 520 (e.g., word features of documents having a first label ("Label 1") associated with a first category), a first group of word layout features 530 (e.g., word layout features of documents having the first label, and a first group of pixel layout features 540 (e.g., pixel layout features of documents having the first label). The training data 510 may include similar groups of word features, word layout features, and pixel layout features, for each other category of n predefined document categories (which are not shown in FIG. 5 for ease of illustration).

The first group of word features 520 may be extracted from each document having the first category label (e.g., label 1). The word features included in the first group of word features 520 may include word identifications, word counts, word ratios, and the like. To illustrate, the first group of word features 520 may include a first set of word features 522 that are extracted from a first document ("Doc 1") of the first category (e.g., having the first category label), a second set of word features 524 may be extracted from a second document ("Doc 2") of the first category, a third set of word features may be extracted from a third document ("Doc 3") of the first category, and an mth set of word features may be extracted from an mth document ("Doc m") of the first category. Although sets of word features from four documents are shown in the example illustrated in FIG. 5, in other examples, there may be fewer than four or more than four sets of word features from respective documents (e.g., m may be any integer greater than one). Each set of word features of the first group of word features 520 includes document-specific feature values for one or more features. As a simplified example, if the word features include a count of a particular word (e.g., lease, lessor, or lessee if the first category is a lease), a particular word ratio (e.g., a ratio of a count of the word "property" to the total number of words in the document if the first category is a lease), and a count of words having a particular length (e.g., words that are longer than eight letters), the first set of word features 522 may include the count of the particular word in the first document, the particular word ratio from the first document, and the count of words having the particular length in the first document, and the second set of word features 524 may include the count of the particular word in the second document, the particular word ratio from the second document, and the count of words having the particular length in the second document. In this example, the first set of word features 522 may indicate that the particular word occurs fifteen times in the first document, that the particular word ratio is 5/65 in the first document, and that the count of words having the particular length in the first document is eight, and the second set of word features 524 may indicate that the particular word occurs eleven times in the second document, that the particular word ratio is 7/68 in the second document, and that the count of words having the particular length in the second document is six. Word features for other categories of documents may be similarly extracted, although the word features extracted for different categories may be different. For example, the particular features extracted for documents of the first category may not be the same as the particular features extracted for documents of the second category. Alternatively, some or all of the particular features extracted for documents of different categories may be the same across the different categories.

The first group of word layout features 530 may be extracted from each document having the first category label (e.g., label 1). The word layout features included in the first group of word layout features 530 may include pixel locations of words in the input document, distances between words, and the like. To illustrate, the first group of word layout features 530 may include a first set of word layout features 532 that are extracted from a first document ("Doc 1") of the first category (e.g., having the first category label), a second set of word layout features 534 may be extracted from a second document ("Doc 2") of the first category, a third set of word layout features may be extracted from a third document ("Doc 3") of the first category, and an mth set of word layout features may be extracted from an mth document ("Doc m") of the first category. Although sets of word layout features from four documents are shown in the example illustrated in FIG. 5, in other examples, there may be fewer than four or more than four sets of word features from respective documents (e.g., m may be any integer greater than one). Each set of word layout features of the first group of word layout features 530 includes document-specific layout feature values for one or more layout features. As a simplified example, if the word layout features include pixel locations of particular words (e.g., location of the words lease, lessor, and lessee if the first category is a lease) and distances between particular words (e.g., distance around the words lease, lessor, and lessee if the first category is a lease), the first set of word layout features 532 may include the pixel locations of particular words in the first document and the distances between particular words of the first document, and the second set of word layout features 534 may include the pixel locations of particular words in the second document and the distances between particular words of the second document. In this example, the first set of word layout features 532 may indicate that a particular word is centered on the page of the first document and there are no words within 24 points of space above, below, to the left, or to the right of the particular word in the first document, and the second set of word layout features 534 may indicate that the particular word is positioned at the bottom left of the page, a colon is positioned immediately to the right of the particular word and no other words are within 24 points of space above, below, or to the left of the particular word in the second document. Word layout features for other categories of documents may be similarly extracted, although the word layout features extracted for different categories may be different. For example, the particular word layout features extracted for documents of the first category may not be the same as the particular word layout features extracted for documents of the second category. Alternatively, some or all of the particular word layout features extracted for documents of different categories may be the same across the different categories.

The first group of pixel layout features 540 may be extracted from each document having the first category label (e.g., label 1). The pixel layout features included in the first group of pixel layout features 540 may include pixel locations of other elements (e.g., non-word elements) in the document, distances between elements, element types, and the like. To illustrate, the first group of pixel layout features 540 may include a first set of pixel layout features 542 that are extracted from a first document ("Doc 1") of the first category (e.g., having the first category label), a second set of pixel layout features 544 may be extracted from a second document ("Doc 2") of the first category, a third set of pixel layout features may be extracted from a third document ("Doc 3") of the first category, and an mth set of pixel layout features may be extracted from an mth document ("Doc m") of the first category. Although sets of pixel layout features from four documents are shown in the example illustrated in FIG. 5, in other examples, there may be fewer than four or more than four sets of pixel layout features from respective documents (e.g., m may be any integer greater than one). Each set of pixel layout features of the first group of pixel layout features 540 includes document-specific pixel layout feature values for one or more pixel layout features. As a simplified example, if the pixel layout features include pixel locations of particular elements in the document (e.g., location of a table if the first category is a trademark document) and distances between particular elements in the document (e.g., is a line the closest element to each side of the table if the first category is a trademark document), the first set of pixel layout features 542 may include the pixel locations of the particular elements in the first document and the distances between the particular elements of the first document, and the second set of pixel layout features 542 may include the pixel locations of the particular elements in the second document and the distances between the particular elements of the second document. In this example, the first set of pixel layout features 542 may indicate that the table is centered with respect to the horizontal and vertical direction of a page in the first document and a line is the closest element to each side of the table in the first document. Pixel layout features for other categories of documents may be similarly extracted, although the pixel layout features extracted for different categories may be different. For example, the pixel layout features extracted for documents of the first category may not be the same as the pixel layout features extracted for documents of the second category. Alternatively, some or all of the pixel layout features extracted for documents of different categories may be the same across the different categories.

The categorizer 214 may be configured to receive the extracted features included in the training data 510 (e.g., the first group of word features 520, the first group of word layout features 530, the first group of pixel layout features 540, and features from documents of other categories). Through supervised learning based on the training data 510, the categorizer 214 may be configured to learn underlying relationships between various word features, word layout features, and pixel layout features of documents having the same category and documents having different categories. In this manner, the categorizer 214 may be configured to assign unlabeled documents to categories based on similarities and differences between feature data of the unlabeled documents and feature data of documents across the predefined document categories.

After the categorizer 214 is trained, the categorizer 214 may receive and categorize unlabeled documents. For example, the categorizer 214 may receive a new document 550 that is an unlabeled document corresponding to one of the predefined document categories. The categorizer 214 may evaluate word features, word layout features, pixel layout features, or a combination thereof, extracted from the new document 550 in order to determine which of the predefined document categories to which the new document 550 is to be assigned. This determination may be based on the underlying relationships between features and categories that the categorizer 214 learned during training. In some implementations, the categorizer 214 may output an indicator of the assigned category. For example, if the predefined document categories include eight categories, the indicator may be a three-digit number where a first value (e.g., 000) indicates the first category, a second value (e.g., 001) indicates a second category, and an eighth value (e.g., 111) indicates an eighth category. In some implementations, the categorizer 214 may output probability values based on the various categories, and the probability values may be used to select a final output indicating the assigned category (e.g., by the categorizer 214, or during post-processing). To illustrate, the categorizer 214 may be configured to output probability scores 560 that indicate likelihoods that the new document 550 (e.g., the received unlabeled document) corresponds to each of the multiple predefined document categories. For example, the probability scores 560 may include a first probability score 562 that indicates a probability that the new document 550 corresponds to the first category (e.g., has the first category label), a second probability score 564 that indicates a probability that the new document 550 corresponds to the second category, a third probability score that indicates a probability that the new document 550 corresponds to the third category, and an nth probability score that indicates a probability that the new document 550 corresponds to the nth category. The categorizer 128 may assign the new document 550 to the category associated with the highest probability score. For example, if the first probability score 562 is 0.2 and corresponds to marketing documents, the second probability score 564 is 0.9 and corresponds to legal documents, and the remaining scores of the probability scores 560 are less than 0.9, the categorizer 214 may assign a label corresponding to legal documents (e.g., Label 2) to the new document 550. Other unlabeled documents maybe be categorized in a similar manner into respective ones of the n predefined document categories.

In some implementations, the output of the categorizer 214 may be provided as feedback information to further train the categorizer 214 (e.g., the ML models included in or accessed by the categorizer 214). For example, the label associated with the new document 550 may undergo a review process, either by a document expert or an automated or semi-automated system, and if the label is approved, the labeled new document 550 may be provided as feedback information for further training the categorizer 214. If the label is not approved, the new document 550 and a corrected label may be provided as feedback information to further train the categorizer 214.

Figure 6:
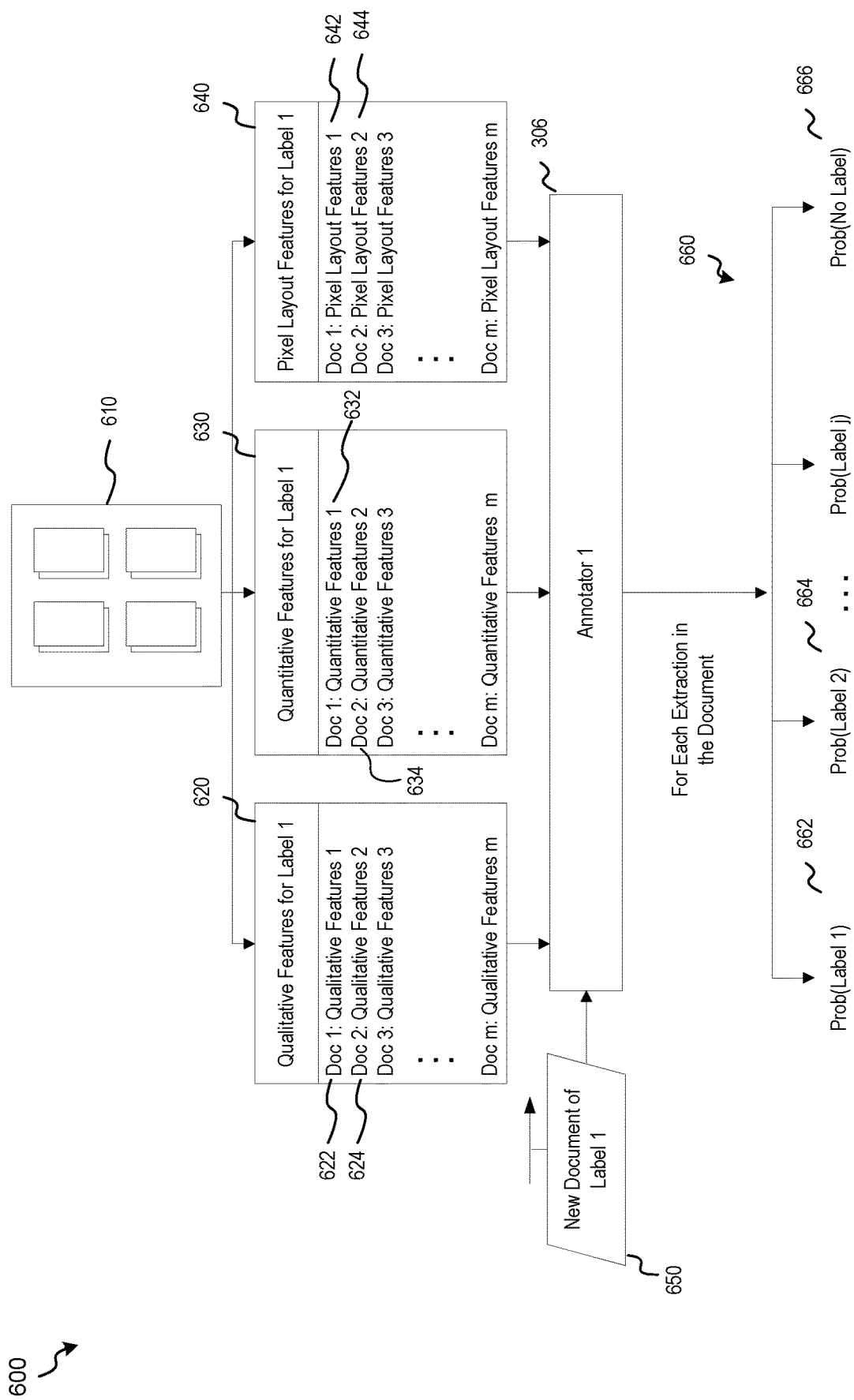
FIG. 6 is a block diagram of an example of the document annotator of FIG. 3.

Referring to FIG. 6, an example 600 of the first annotator 306 is shown. As shown in FIG. 6, during a training process, the first annotator 306 may receive training data 610 for use in training one or more ML models that are included in or accessible to the first annotator 306. In some implementations, the ML models may include or correspond to the second ML models 134 of FIG. 1. As described with reference to FIG. 3, the first annotator 306 is configured to generate annotation data for input documents of the first category ("Label 1"). Accordingly, the training data 610 may be generated based on multiple annotated documents the first category, as further described above with reference to FIG. 4. The training data 610 may include various types of features extracted from the annotated documents, such as qualitative features, quantitative features, and pixel layout features, as a non-limiting example. The feature data may combined with annotation data to generate the training data 610, such that the training data 610 may be used during a supervised learning process to train the first annotator 306. For example, the training data 610 may include a first group of qualitative features 620 (e.g., qualitative features of documents having a first label ("Label 1") associated with a first category), a first group of quantitative features 630 (e.g., quantitative features of documents having the first label), and a first group of pixel layout features 640 (e.g., pixel layout features of documents having the first label). The training data 610 may include annotation data associated with each of the documents, such as a list of category-specific entities and entity values for the entities in each of the documents.

The first group of qualitative features 620 may be extracted from each document having the first category label (e.g., label 1). The qualitative features included in the first group of qualitative features 620 may include length of words, percentage of capital letters in words, percentage of numbers in words, fuzzy representations of words, other qualitative word features, and the like. To illustrate, the first group of qualitative features 620 may include a first set of qualitative features 622 that are extracted from a first document ("Doc 1") of the first category, a second set of qualitative features 624 may be extracted from a second document ("Doc 2") of the first category, a third set of qualitative features may be extracted from a third document ("Doc 3") of the first category, and an mth set of qualitative features may be extracted from an mth document ("Doc m") of the first category. Although sets of qualitative features from four documents are shown in the example illustrated in FIG. 6, in other examples, there may be fewer than four or more than four sets of qualitative features from respective documents (e.g., m may be any integer greater than one). Each set of qualitative features of the first group of qualitative features 620 includes document-specific qualitative feature values for one or more qualitative features. As a simplified example, if the qualitative features include length of words that satisfy a threshold (e.g., at least 17 consecutive characters if the first category is a purchase order) and a percentage of capital letters in words (e.g., ratio of capital letters to lowercase letters and numbers if the first category is a purchase order), the first set of qualitative features 622 may include lengths of each word with at least 17 characters in the first document and the percentage of capital letters in each word in the first document, and the second set of qualitative features 624 may include lengths of each word with at least 17 characters in the second document and the percentage of capital letters in each word in the second document.

The first group of quantitative features 630 may be extracted from each document having the first category label (e.g., label 1). The quantitative features included in the first group of quantitative features 630 may include word counts, word locations (e.g., pixel locations of an optimal bounded four-sided polygon and a centroid of each word), other quantitative word features, and the like. To illustrate, the first group of quantitative features 630 may include a first set of quantitative features 632 that are extracted from the first document, a second set of quantitative features 634 may be extracted from the second document, a third set of quantitative features may be extracted from the third document, and an mth set of quantitative features may be extracted from the mth document. Although sets of quantitative features from four documents are shown in the example illustrated in FIG. 6, in other examples, there may be fewer than four or more than four sets of quantitative features from respective documents (e.g., m may be any integer greater than one). Each set of quantitative features of the first group of quantitative features 630 includes document-specific quantitative feature values for one or more quantitative features. As a simplified example, if the quantitative features include word counts of particular words (e.g., math, English, or history if the first category is an educational document) and word locations of the particular words (e.g., pixel locations of the words math, English, or history if the first category is an educational document), the first set of quantitative features 632 may include word counts of the particular words and word locations of the particular words in the first document, and the second set of quantitative features 634 may include word counts of the particular words and word locations of the particular words in the second document. In this example, the first set of quantitative features 632 may indicate that a particular word (e.g., math) appears ten times in the first document and the particular word is located at the top right of the first document, and the second set of quantitative features 634 may indicate that the particular word appears seven times in the second document and the particular word is located at the bottom right of the second document.

The first group of pixel layout features 640 may be extracted from each document having the first category label (e.g., label 1). The pixel layout features included in the first group of pixel layout features 640 may include pixel locations of other (e.g., non-word) elements in the document, distances between non-word elements, element types, and the like. To illustrate, the first group of pixel layout features 640 may include a first set of pixel layout features 642 that are extracted from the first document, a second set of pixel layout features 644 may be extracted from the second document, a third set of pixel layout features may be extracted from the third document, and an mth set of pixel layout features may be extracted from the mth document. Although sets of pixel layout features from four documents are shown in the example illustrated in FIG. 6, in other examples, there may be fewer than four or more than four sets of pixel layout features from respective documents (e.g., m may be any integer greater than one). Each set of pixel layout features of the first group of pixel layout features 640 includes document-specific pixel layout feature values for one or more pixel layout features. As a simplified example, if the pixel layout features include pixel locations of particular elements in the document (e.g., location of a court seal if the first category is a legal document) and distances between particular elements in the document (e.g., markings corresponding to a particular stamp are located within a half inch of the perimeter of the court seal in any direction if the first category is a legal document), the first set of pixel layout features 642 may include the pixel locations of the particular elements in the first document and the distances between the particular elements in the first document, and the second set of pixel layout features 644 may include the pixel locations of the particular elements in the second document and the distances between the particular elements in the second document. In this example, the first set of pixel layout features 642 may indicate that the court seal is located at the bottom right in the first document and the markings corresponding to the particular stamp are located within a quarter inch of the perimeter of the court seal in the first document, and the second set of pixel layout features 644 may indicate that the court seal is located at the bottom center in the second document and the markings corresponding to the particular stamp are located within an eighth of an inch of the perimeter of the court seal in the second document.

The first annotator 306 may be configured to receive the extracted features included in the training data 610 (e.g., the first group of qualitative features 620, the first group of quantitative features 630, the first group of pixel layout features 640, and annotation data associated with the documents). Through supervised learning based on the training data 610, the first annotator 306 may be configured to learn underlying relationships between various qualitative features, quantitative features, pixel layout features, and annotations of documents having the same category. In this manner, the first annotator 306 may be configured to tag words of input documents that correspond to predefined entities (e.g., words or phrases that are highly informative and relevant to summarizing documents of the respective document category) based on similarities and differences between feature data and annotation data of the different documents of the first category. Other category-specific annotators (e.g., other ML models) may be similarly trained using category-specific training data.

After the first annotator 306 is trained, the first annotator 306 may receive and annotate labeled (e.g., categorized) documents of the first document category (Label 1). For example, the first annotator 306 may receive a new document 650 of the first category that is labeled by the categorizer 214 of FIGS. 2, 3, and 5 (e.g., the new document 650 may include a generated label, or the new document 650 may be provided to the first annotator 306 based on an output of the categorizer 214). The first annotator 306 may evaluate qualitative features, quantitative features, pixel layout features, or a combination thereof, extracted from the new document 650 in order to determine which words or phrases to tag as entity values in the new document 650 in order to generate annotation data that indicates the values of the category-specific entities associated with the first category. This determination may be based on the underlying relationships between features and annotation data that the first annotator 306 learned during training. In some implementations, the first annotator 306 may output annotation data that indicates the names and values of each of the category-specific entities. For example, if the first category is leases, the annotation data may indicate the entity name "lessor" and a corresponding word or phrase from the new document 650, the entity name "lessee" and a corresponding word or phrase from the document 650, the entity name "start date" and a corresponding word or phrase from the new document 650, and the entity name "lease term" and a corresponding word or phrase from the new document 650. In some implementations, the annotator 306 may output probability values indicating a likelihood that each extraction (e.g., word or phrase) from the new document 650 corresponds to the category-specific entities or is not an entity, and the probability values may be used to generate the annotation data. As described above with reference to FIG.

4, the probability values may be based on quantitative features from the new document 650. To illustrate, the first annotator 306 may be configured to output probability scores 660 that indicate likelihoods that a particular word or phrase of the new document 650 corresponds to each of the category-specific entities or is not an entity. For example, the probability scores 660 may include a first probability score 662 that indicates a probability that the particular word or phrase corresponds to a first entity associated with the first category, a second probability score 664 that indicates a probability that the particular word or phrase corresponds to a second entity associated with the first category, a jth probability score that indicates a probability that the particular word or phrase corresponds to a jth entity associated with the first category (where j is the number of category-specific entities associated with the first category and may be any positive integer), and a non-entity probability score 666 that indicates a probability that the particular word or phrase is not an entity associated with the first category. The first annotator 306 may tag the word or phrase of the new document 650 as an entity value of the particular entity associated with the highest probability score of the probability scores 660 (or as not being an entity value if the non-entity probability score 666 is the highest probability score). For example, if the first probability score 662 is 0.2 and corresponds to lessor, the second probability score 664 is 0.9 and corresponds to lease term, and the remaining scores of the probability scores 660 are less than 0.9 (including the non-entity probability score 666), the first annotator 306 may tag the particular word or phrase as corresponding to a lease term (e.g., generate annotation data that indicates that the entity lease term has the value of the word or phrase). Other extractions (e.g., word(s) or phrase(s)) from the new document 650 may be tagged in a similar manner as respective entity values of the j category-specific entities. In some other implementations, the first annotator 306 may be configured to perform a two-stage probability score generation process. The first stage may include outputting, for each extracted word or phrase from the new document 650, a probability score indicating the probability that the word or phrase is any entity. The second stage may include outputting, for each word or phrase associated with probability scores that satisfy a threshold, probability scores indicating the probability that the word or phrase is each of the category specific entities associated with the first category.

In some implementations, the output of the first annotator 306 may be provided as feedback information to further train the first annotator 306 (e.g., the ML models included in or accessed by the first annotator 306). For example, the annotation data (e.g., the tagged words or phrases) associated with the new document 650 may undergo a review process, either by a document expert or an automated or semi-automated system, and if the annotation data is approved, the annotation data and the features generated based on the new document 650 may be provided as feedback information for further training the first annotator 306. If the annotation data is not approved, the features generated based on the new document 650 and corrected annotation data may be provided as feedback information to further train the first annotator 306.

Figure 7:
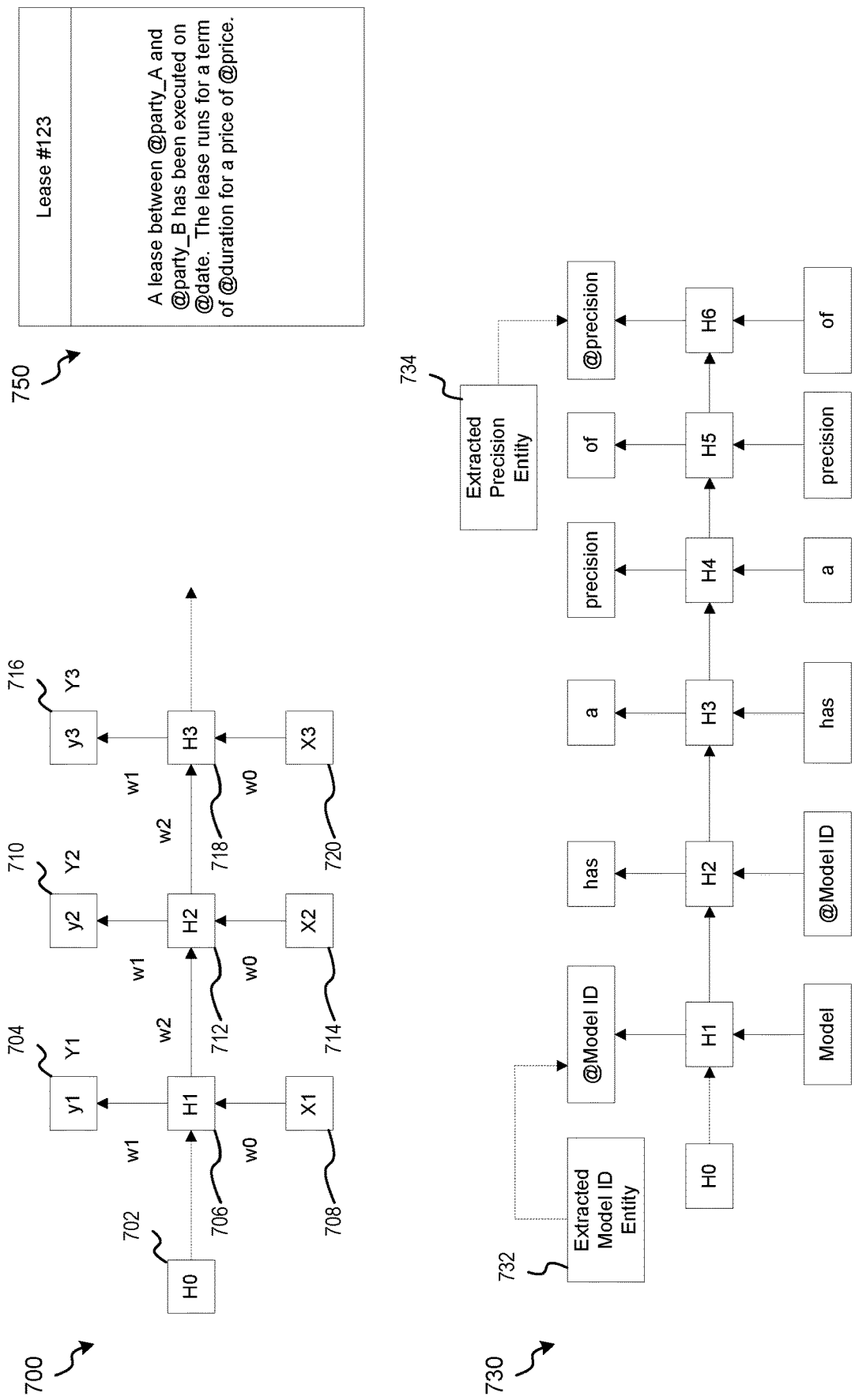
FIG. 7 is a block diagram of an example of a model implemented by the document summarizer of FIG. 3.

Referring to FIG. 7, an example of a model 700 implemented by the first summarizer 310 is shown. As described above with reference to FIGS. 1-3, the first summarizer 310 may include or access one or more ML models, such as one or more NNs, that are trained to summarize documents of a particular category (Label 1). The model 700 is a representation of the model implemented by the one or more NNs (or other types of ML models). In some implementations, the one or more NNs include one or more recurrent neural networks (RNNs) that are configured as a long short-term memory (LSTM) network to predict different words or phrases at various points of a category-specific document template based on annotation data. In some such implementations, the underlying rationale behind predicting the correct ordering of words for the summarization is obtaining probabilities of the sequences of words and entities. For example, for a summary that includes information about a model and precision, the probability of the of a first sequence of words and entities, P("Model 100876 has a precision of 76%), may be greater than the probability of a second sequence of words and entities, P("The precision 100876 has a Model of 76%"). The difference in probability between these two sequences reflects the difference in semantic coherence and readability between the two sequences. Using RNNs (e.g., a LSTM) instead of other ML models, such as hidden Markov models (HMMs) may capture hidden states of the sequence of words and entities at different time steps of the "concerned" (e.g., related) text, which may enable prediction of words that depend on text in a previous sentence instead of only a few previous words (e.g., n-grams). Special cases inside the graphs of the model may be compensated for by use of a rule-based algorithm. For example, if one or more nodes are missing from the model of the sequence due to lack of data in a training set, those entities may be effectively excluded from the main summarization, enabling leaner and more compact models. Metadata, such as a footnote, may be added to the output summary to emphasize the missing information for future reference.

As shown in FIG. 7, the model 700 includes states, inputs, and outputs for forming a sequence of words and entities to be output as a summary of an input document. For example, the model 700 may include an initial state 702 ("H0"), a first state 706 ("H1"), a second state 712 ("H2"), a third state 718 ("H3"), a first input 708 ("X1"), a second input 714 ("X2"), a third input 720 ("X3"), a first output 704 ("y1"), a second output 710 ("y2"), and a third output 716 ("y3"). The inputs 708, 714, and 720 may include input word vectors at different time steps in the input document. The outputs 704, 710, and 716 may include probability distributions of different words in the training set. Each output may be used to determine the actual words occurring after the corresponding input in the sequence. For example, the first output 704 may be used to determine the word Y1 occurring after the first input 708, the second output 710 may be used to determine the word Y2 occurring after the second input 714, and the third output 716 may be used to determine the word Y3 occurring after the third input 720. The states 702, 706, 712, and 718 may be hidden states at different time stamps in the input document.

FIG. 7 also shows an illustrative model 730 that is generated using the model 700 for a particular document, in this example a document about model accuracy. In the example shown in FIG. 7, the model 730 generates the sequence of words and entities "Model @ModelID has a precision of @precision." In this sequence, the words "Model," "has," "a," "precision," and "of" are static category-specific text, and the words "@ModelID" and "@precision" are entity names. The sequence may be used to generate a summary of the input document by including a ModelID entity value 732 for the entity name "ModelID" and a precision entity value 734 for the entity name "precision." The ModelID entity value 732 and the precision entity value 734 may be indicated by annotation data generated based on the input document, such as by the first annotator 306 of FIGS. 3 and 6.

FIG. 7 also depicts an illustrative summary 750. The summary 750 may be generated by a category-specific summarizer associated with a lease category of documents. In the example shown in FIG. 7, the summary 750 includes the text "A lease between @party_A and @party_B has been executed on @date. The lease runs for a term of @duration for a price of @price." In this example, the words or phrases "@party_A," "@party_B," "@date," "@duration," and "@price" represent entity values for the category-specific entities party_A, party_B, date, duration, and price, which may be indicated by annotation data associated with a lease being summarized. In some implementations, the summarizer may be trained based on one or more document summary templates. For example, the summarizer may be trained based on a lease summary template that includes the text of the summary 750 and the category-specific entity names. Additionally or alternatively, the summarizer may be trained based on one or more reference lease summaries.

In some implementations, the summarizer may be trained to generate the same static text and ordering of words and entities for all summaries for the particular category. For example, the summarizer may generate all summaries by inputting entity values into the summary 750. Alternatively, summaries for the same document category may be different based on input annotation data. For example, the summarizer may be trained using different lease summaries for leases that run less than a year and for leases that run more than a year. In such example, the text, the ordering, or both, included in the summary 750 may be different based on the entity value @duration.

Figure 8:
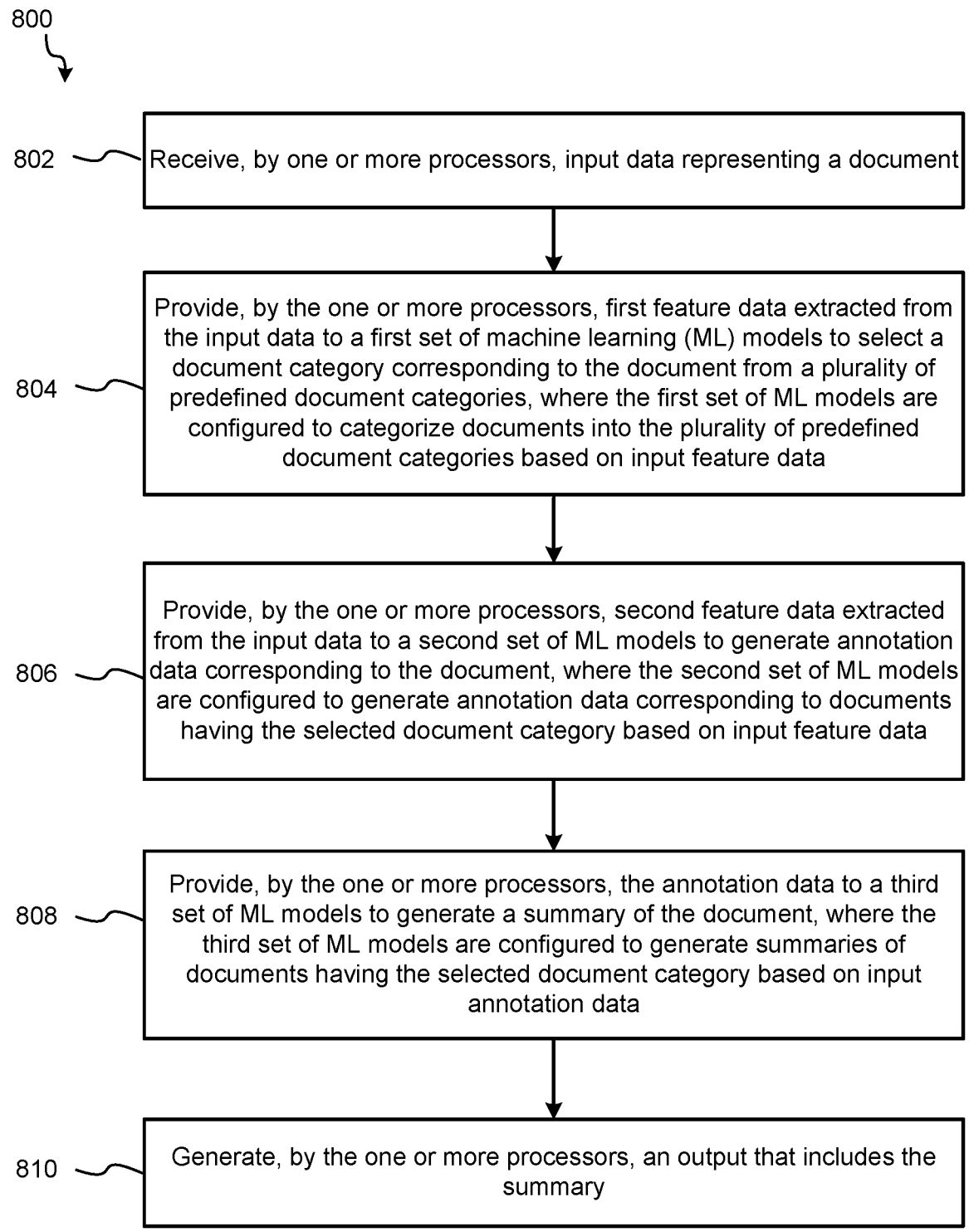
FIG. 8 is a flow diagram illustrating an example of a method for category-specific document summarization according to one or more aspects.

Referring to FIG. 8, a flow diagram of an example of a method for category-specific document summarization according to one or more aspects is shown as a method 800. In some implementations, the operations of the method 800 may be stored as instructions that, when executed by one or more processors (e.g., the one or more processors of a document processing device or a server), cause the one or more processors to perform the operations of the method 800. In some implementations, the method 800 may be performed by a document processing device, such as the document processing device 102 of FIG. 1 (e.g., a document processing device configured for type-specific document summarization), the system 200 of FIG. 2, the document converter 210 of FIG. 3, the categorizer 214 of FIG. 5, the first annotator 306 of FIG. 6, or a combination thereof.

The method 800 includes receiving input data representing a document, at 802. For example, the input data may include or correspond to the input data 150 of FIG. 1. The method 800 includes providing first feature data extracted from the input data to a first set of ML models to select a document category corresponding to the document from a plurality of predefined document categories, at 804. For example, the first feature data may include or correspond to the first feature data 112 of FIG. 1, the first set of ML models may include or correspond to the first ML models 130 of FIG. 1, and the document category may include or correspond to the document category 120 of FIG. 1. The first set of ML models are configured to categorize documents into the plurality of predefined document categories based on input feature data. For example, the categorizer 128 of FIG. 1 may be configured to access the first ML models 130 to categorize documents into multiple different document categories.

The method 800 includes providing second feature data extracted from the input data to a second set of ML models to generate annotation data corresponding to the document, at 806. For example, the second feature data may include or correspond to the second feature data 116 of FIG. 1, the second set of ML models may include or correspond to the second ML models 134 of FIG. 1, and annotation data may include or correspond to the annotation data 118 of FIG. 1. The second set of ML models are configured to generate annotation data corresponding to documents having the selected document category based on input feature data. For example, the annotator 132 of FIG. 1 may be configured to access the second ML models 134 generate category-specific annotation data based on input documents.

The method 800 includes providing the annotation data to a third set of ML models to generate a summary of the document, at 808. For example, the third set of ML models may include or correspond to the third ML models 138 of FIG. 1 and the summary of the document may include or correspond to the document summary 122 of FIG. 1. The third set of ML models are configured to generate summaries of documents having the selected document category based on input annotation data. For example, the summarizer 136 may be configured to access the third ML models 138 generate category-specific summaries of input documents. The method 800 further includes generating an output that includes the summary, at 810. For example, the output may include or correspond to the output 152 of FIG. 1.

In some implementations, the first feature data may include word features associated with the document, word layout features associated with the document, and pixel features associated with one or more non-word elements of the document. For example, the word features may include or correspond to word features of the new document 550 of FIG. 5, the word layout features may include or correspond to word layout features of the new document 550 of FIG. 5, and the pixel features may include or correspond to the pixel layout features of the new document 550 of FIG. 5. In some such implementations, the one or more non-word elements may include an image, a graphic, a table, a heading, a sub-heading, or a combination thereof, and the pixel features may be stored in a 3D matrix data structure, as further described with reference to FIG. 4.

In some implementations, the first set of ML models may be configured to output a plurality of probability scores, each probability score indicating a likelihood that the document corresponds to a respective predefined document category of the plurality of predefined document categories. For example, the plurality of probability scores may include or correspond to the probability scores 114 of FIG. 1. Additionally or alternatively, generating the output may include initiating display of a GUI that includes the summary. The summary may include text, images or objects, or a combination thereof, as further described with reference to FIG. 7.

In some implementations, the second feature data may include qualitative word features associated with the document and quantitative word features associated with the document. For example, the qualitative word features may include or correspond to qualitative features of the new document 650 of FIG. 6 and the quantitative word features may include or correspond to quantitative features of the new document 650 of FIG. 6.

In some implementations, the annotation data corresponding to the document may include a document label associated with the document and one or more sets of entity information associated with the selected document category. Each set of entity information includes an entity label and an entity value. For example, the document label may include or correspond to the document type annotations 420 of FIG. 4, the entity label may include or correspond to the first entity name 452 of FIG. 4 or the second entity name 454 of FIG. 4, and the entity value may include of correspond to the first entity value 456 of FIG. 4 or the second entity value 458 of FIG. 4. In some such implementations, the second set of ML models may be configured to output a plurality of probability scores associated with one or more extractions from the document, each probability score indicating a likelihood that the extraction corresponds to a respective set of the one or more sets of entity information. For example, the plurality of probability scores may include or correspond to the probability scores 114 of FIG. 1 or the probability scores 560 of FIG. 5. Additionally or alternatively, the summary may include the entity values of the one or more sets of entity information and category-specific text associated with the selected document category. For example, the summary may include or correspond to the summary 750 of FIG. 7, which includes entity values (e.g., "@party_A," "@party_B," "@date," etc.) and category-specific text (e.g., "The lease between . . . and . . . has been executed on . . . "). In some such implementations, the entity values and the category-specific text are ordered in the summary based at least in part on the entity labels and the entity values, as further described with reference to FIG. 7.

In some implementations, the method 800 includes providing fourth feature data extracted from second input data representing a second document to the first set of ML models to select a second document category corresponding to the second document. For example, the second document may include or correspond to the second new document 304 of FIG. 3. In such implementations, the method 800 also includes providing fifth feature data extracted from the second input data to a fourth set of ML models to generate second annotation data corresponding to the second document. The fourth set of ML models may be configured to generate annotation data corresponding to documents having the second document category based on input feature data. For example, the fourth set of ML models may include or correspond to ML models accessed by the third annotator 308 of FIG. 3. In such implementations, the method 800 also includes providing the second annotation data to a fifth set of ML models to generate a second summary of the second document. The fifth set of ML models may be configured to generate summaries of documents having the second document category based on input annotation data. For example, the fifth set of ML models may include or correspond to ML models accessed by the third summarizer 312 of FIG. 3. In such implementations, the method 800 further includes generating a second output that includes the second summary. For example, the second summary may include or correspond to the second summarized document 316 of FIG. 3.

In some implementations, the method 800 also includes training the first set of ML models based on first training data prior to generating the first feature data. The first training data may include a document label, word features, word layout features, and pixel features associated with multiple documents for each of the plurality of predefined document categories. For example, the training data 110 of FIG. 1 may include a first portion that includes the document type annotations 420 of FIG. 4, the word features 520 of FIG. 5 (and word features for documents of other categories), the word layout features 530 of FIG. 5 (and word layout features for documents of other categories), and the pixel layout features 540 of FIG. 5 (and pixel layout features for documents of other categories). Additionally or alternatively, the method 800 may also include training the second set of ML models based on second training data prior to generating the second feature data. The second training data may include qualitative word features, quantitative word features, and one or more sets of entity information associated with multiple documents of the selected document category. For example, the training data 110 of FIG. 1 may include a second portion that includes the qualitative features 620 of FIG. 6, the quantitative features 630 of FIG. 6, the pixel layout features 640 of FIG. 6, and category-specific entity information. Additionally or alternatively, the method 800 may also include training the third set of ML models based on third training data prior to generating the annotation data corresponding to the document. The third training data may include multiple summaries and associated annotation information for the selected document category. For example, the training data 110 of FIG. 1 may include a third portion that includes category-specific summary templates and category-specific annotation data.

In some implementations, the method 800 further includes receiving second input data representing a second document and providing fourth feature data extracted from the second input data to the first set of ML models to select a second document category corresponding to the second document. For example, feature data extracted from the second new document 304 may be provided to the categorizer 214 of FIG. 3 to assign a document category to the second new document 304. Additionally or alternatively, the summary may include a first set of entity values and category-specific text associated with the selected document category, a second summary of a second document of the selected document category may include a second set of entity values and the category-specific text associated with the selected document category, and an ordering of the first set of entity values and the category-specific text may be different than an ordering of the second set of entity values and the category-specific text. The second set of entity values may include at least one entity value that is different than the first set of entity values, or a combination thereof. For example, different documents of the same category may result in slightly different summaries, as further described with reference to FIG. 7.

In some implementations, the input data may include text data, image data, unlabeled document data, or a combination thereof. For example, the input data 150 may include text data of one or more documents, image data of one or more documents, unlabeled document data (e.g., a pdf file with no metadata), or a combination thereof. Additionally or alternatively, the input data may be received from a workbench processor or a document warehouse, and the output may be transmitted to the document warehouse. For example, the workbench processor may include or correspond to the workbench processor 202 of FIG. 2, and the document warehouse may include or correspond to the document warehouse 206 of FIG. 2.

As described above, the method 800 supports summarization of unlabeled documents across multiple predefined document categories with little to no user input. For example, the method 800 may be automated at an electronic device that utilizes specially trained ML models to automatically categorize, annotate, and summarize an input document. Additionally, the method 800 may result in document summaries that are more semantically precise and more readable (e.g., grammatically correct and similar to human-generated text) than document summaries generated by conventional techniques, due to the use of trained ML models that annotate documents based on features extracted from an entirety of the document, instead of within predefined distances of particular words or phrases. At least some of the ML models used to perform the method 800 may be trained using significantly fewer training documents as compared to the large volume of reference documents some conventional systems analyze to improve semantic understanding of documents, which may reduce a memory footprint of a device that perform the method 800 or trains ML models for use in performance of the method 800.

It is noted that other types of devices and functionality may be provided according to aspects of the present disclosure and discussion of specific devices and functionality herein have been provided for purposes of illustration, rather than by way of limitation. It is noted that the operations of the method 800 of FIG. 8 may be performed in any order, or that operations of one method may be performed during performance of another method. It is also noted that the method 800 of FIG. 8 may also include other functionality or operations consistent with the description of the operations of the system 100 of FIG. 1, the system 200 of FIG. 2, the document converter 210 of FIG. 3, the examples 400 of FIG. 4, the categorizer 214 of FIG. 5, the first annotator 306 of FIG. 6, the model 700 of FIG. 7, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for category-specific document summarization, the method comprising:

receiving, by one or more processors, input data representing a document;

providing, by the one or more processors, first feature data extracted from the input data to a first set of machine learning (ML) models to determine a document category corresponding to the document from a plurality of predefined document categories, wherein the first set of ML models are configured to categorize documents into the plurality of predefined document categories based on input feature data;

automatically selecting, by the one or more processors, a second set of ML models based on the document category determined by the first set of ML models, wherein the second set of ML models are configured to generate category-specific annotation data for documents having the document category based on input feature data;

providing, by the one or more processors, second feature data extracted from the input data to the second set of ML models to generate category-specific annotation data corresponding to the document;

providing, by the one or more processors, the annotation data to a third set of ML models to generate a summary of the document, wherein the third set of ML models are configured to generate summaries of documents having the document category based on input annotation data; and generating, by the one or more processors, an output that includes the summary.

2. The method of claim 1, wherein the first feature data includes word features associated with the document, word layout features associated with the document, and pixel features associated with one or more non-word elements of the document.

3. The method of claim 2, wherein:
the one or more non-word elements include an image, a graphic, a table, a heading, a sub-heading, or a combination thereof, and
the pixel features are stored in a three-dimensional (3D) matrix data structure.

4. The method of claim 1, wherein the first set of ML models are configured to output a plurality of probability scores, each probability score indicating a likelihood that the document corresponds to a respective predefined document category of the plurality of predefined document categories.

5. The method of claim 1, wherein generating the output comprising initiating, by the one or more processors, display of a graphical user interface (GUI) that includes the summary, the summary including text, images or objects, or a combination thereof.

6. The method of claim 1, wherein the second feature data include qualitative word features associated with the document and quantitative word features associated with the document.

7. The method of claim 1, wherein the annotation data corresponding to the document includes a document label associated with the document and one or more sets of entity information associated with the document category, each set of entity information include an entity label and an entity value.

8. The method of claim 7, wherein the second set of ML models are configured to output a plurality of probability scores associated with one or more extractions from the document, each probability score indicating a likelihood that the extraction corresponds to a respective set of the one or more sets of entity information.

9. The method of claim 7, wherein the summary includes the entity values of the one or more sets of entity information and category-specific text associated with the document category.

10. The method of claim 1, further comprising:
providing, by the one or more processors, fourth feature data extracted from second input data representing a second document to the first set of ML models to determine a second document category corresponding to the second document;
automatically selecting, by the one or more processors, a fourth set of ML models based on the second document category determined by the first set of ML models, wherein the fourth set of ML models are configured to generate category-specific second annotation data for documents having the second document category based on input feature data;
providing, by the one or more processors, fifth feature data extracted from the second input data to the fourth set of ML models to generate second annotation data corresponding to the second document;
providing, by the one or more processors, the second annotation data to a fifth set of ML models to generate a second summary of the second document, wherein the fifth set of ML models are configured to generate summaries of documents having the second document category based on input annotation data; and generating, by the one or more processors, a second output that includes the second summary.

11. A non-transitory computer-readable storage medium storing instructions that, when executed by one or more processors, cause the one or more processors to perform operations for category-specific document summarization, the operations comprising:
receiving input data representing a document;
providing first feature data extracted from the input data to a first set of machine learning (ML) models to select a document category corresponding to the document from a plurality of predefined document categories, wherein the first set of ML models are configured to categorize documents into the plurality of predefined document categories based on input feature data;
automatically selecting a second set of ML models based on the document category determined by the first set of ML models, wherein the second set of ML models are configured to generate category-specific annotation data for documents having the document category based on input feature data;
providing second feature data extracted from the input data to the second set of ML models to generate category-specific annotation data corresponding to the document;
providing the annotation data to a third set of ML models to generate a summary of the document, wherein the third set of ML models are configured to generate summaries of documents having the document category based on input annotation data; and
generating an output that includes the summary.

12. The non-transitory computer-readable storage medium of claim 11, wherein the operations further comprise training the second set of ML models based on second training data prior to generating the second feature data, and
wherein the second training data includes qualitative word features, quantitative word features, and one or more sets of entity information associated with multiple documents of the document category.

13. The non-transitory computer-readable storage medium of claim 11, wherein the operations further comprise training the third set of ML models based on third training data prior to generating the annotation data corresponding to the document, and
wherein the third training data includes multiple summaries and associated annotation information for the document category.

14. The non-transitory computer-readable storage medium of claim 11, wherein the operations further comprise:
receiving second input data representing a second document; and
providing fourth feature data extracted from the second input data to the first set of ML models to determine a second document category corresponding to the second document.

15. The non-transitory computer-readable storage medium of claim 11, wherein:
the summary includes a first set of entity values and category-specific text associated with the selected document category,
a second summary of a second document of the document category includes a second set of entity values and the category-specific text associated with the document category, and
an ordering of the first set of entity values and the category-specific text is different than an ordering of the second set of entity values and the category-specific text, the second set of entity values includes at least one entity value that is different than the first set of entity values, or a combination thereof.

16. A device for category-specific document summarization, the device comprising:
a memory; and
one or more processors communicatively coupled to the memory, the one or more processors configured to:
receive input data representing a document;
provide first feature data extracted from the input data to a first set of machine learning (ML) models to determine a document category corresponding to the document from a plurality of predefined document categories,
wherein the first set of ML models are configured to categorize documents into the plurality of predefined document categories based on input feature data;
automatically select a second set of ML models based on the document category determined by the first set of ML models, wherein the second set of ML models are configured to generate category-specific annotation data for documents having the document category based on input feature data;
provide second feature data extracted from the input data to the second set of ML models to generate category-specific annotation data corresponding to the document;
provide the annotation data to a third set of ML models to generate a summary of the document,
wherein the third set of ML models are configured to generate summaries of documents having the document category based on input annotation data; and
generate an output that includes the summary.

17. The device of claim 16, wherein the input data comprises text data, image data, unlabeled document data, or a combination thereof.

18. The device of claim 16, further comprising a network interface configured to:
receive the input data from a workbench processor or a document warehouse, and
transmit the output to the document warehouse.

19. The method of claim 8, wherein, for each of at least a subset of the one or more sets of entity information, the entity value is the extraction from the one or more extractions with the highest corresponding probability score for the entity label.

20. The method of claim 1, wherein the second set of ML models are configured to:
determine, with a first subset of the second set of ML models, first probability scores for one or more extractions from the document, wherein the first probability scores indicate a likelihood that the extraction is an entity value;
select a subset of the one or more extractions with corresponding first probability scores that satisfy a threshold; and
determine, with a second subset of the second set of ML models, second probability scores for the subset of the one or more extractions, wherein the second probability scores indicate a likelihood that the extraction corresponds to particular category-specific entities.

21. The method of claim 9, wherein the entity values and the category-specific text are ordered in the summary based at least in part on the entity labels and the entity values.

22. The non-transitory computer-readable storage medium of claim 11, wherein the operations further comprise training the first set of ML models based on first training data prior to generating the first feature data, and
wherein the first training data includes a document label, word features, word layout features, and pixel features associated with multiple documents for each of the plurality of predefined document categories.

* * * * *